United States Patent
Wilz, Sr. et al.

(10) Patent No.: US 6,347,743 B2
(45) Date of Patent: Feb. 19, 2002

(54) METHOD AND APPARATUS FOR PROGRAMMING FUNCTIONAL SYSTEM PARAMETERS IN OPTICAL BAR CODE SCANNERS

(75) Inventors: David M. Wilz, Sr., Sewell; John Furlong; Donald Hudrick, both of Woodbury; Carl H. Knowles, Moorestown, all of NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 09/777,114

(22) Filed: Feb. 5, 2001

Related U.S. Application Data

(63) Continuation of application No. 09/481,798, filed on Jul. 6, 1998, which is a continuation of application No. 08/697,154, filed on Aug. 21, 1996, now Pat. No. 5,777,315, which is a continuation of application No. 08/389,320, filed on Feb. 16, 1995, now abandoned, which is a continuation-in-part of application No. 09/346,859, filed on Jul. 2, 1999, which is a continuation-in-part of application No. 08/890,576, filed on Jul. 9, 1997, which is a continuation-in-part of application No. 08/292,237, filed on Aug. 17, 1994, and a continuation-in-part of application No. 08/293,695, filed on Aug. 19, 1994, now Pat. No. 5,468,951, which is a continuation-in-part of application No. 07/898,919, filed on Jun. 12, 1992, now Pat. No. 5,340,973, which is a continuation-in-part of application No. 09/273,825, filed on Mar. 22, 1999, which is a continuation-in-part of application No. 08/293,493, filed on Aug. 19, 1994, now Pat. No. 5,525,789, which is a continuation of application No. 07/761,123, filed on Sep. 17, 1991, now Pat. No. 5,340,971.

(51) Int. Cl.[7] .................................................. G06K 7/10
(52) U.S. Cl. ............................. 235/472.01; 235/462.01
(58) Field of Search ........................ 235/472.01, 462.01

(56) References Cited

U.S. PATENT DOCUMENTS 5,214,268 A   5/1993   Doing 5,777,315 A * 7/1998 Wilz et al. ............. 235/472.01

FOREIGN PATENT DOCUMENTS

EP   0459025 A2 * 12/1991

* cited by examiner

Primary Examiner—Harold I. Pitts
(74) Attorney, Agent, or Firm—Hopgood, Calimafde, Judlowe & Mondolino, LLP

(57) ABSTRACT

A novel system and method for programming one or more functional parameters of programmable bar code symbol readers and scanners, while avoiding the need to connect a data communication port of a computer system to a bar code symbol reader that is to be programmed. In a first illustrative embodiment, the function-encoded parameters of a master bar code symbol reader are determined using a computer-based-function-parameter device and subsequently buffered in memory buffer contained therein; the buffered function-encoded parameters are used to produce a list of function-encoded bar code symbols which are printed in a specified reading sequence; and the list of printed-function encoded bar code symbols are read in the specified reading sequence so as to configure the bar code symbol reader with the same set of function-encoded parameters that were programmed in the master bar code symbol reader. In a second illustrative embodiment, the function-encoded parameters of a master bar code symbol reader are determined using a computer based-function-parameter acquisition device and buffered in a memory buffer contained therein; the buffered friction-encoded parameters are used to produce a list of symbol reading instructions, each referencing a specific function encoded bar code symbol on a particular page of a preprinted bar code symbol programming guide, and the list of symbol reading instructions are used to read in a specified order.

11 Claims, 21 Drawing Sheets

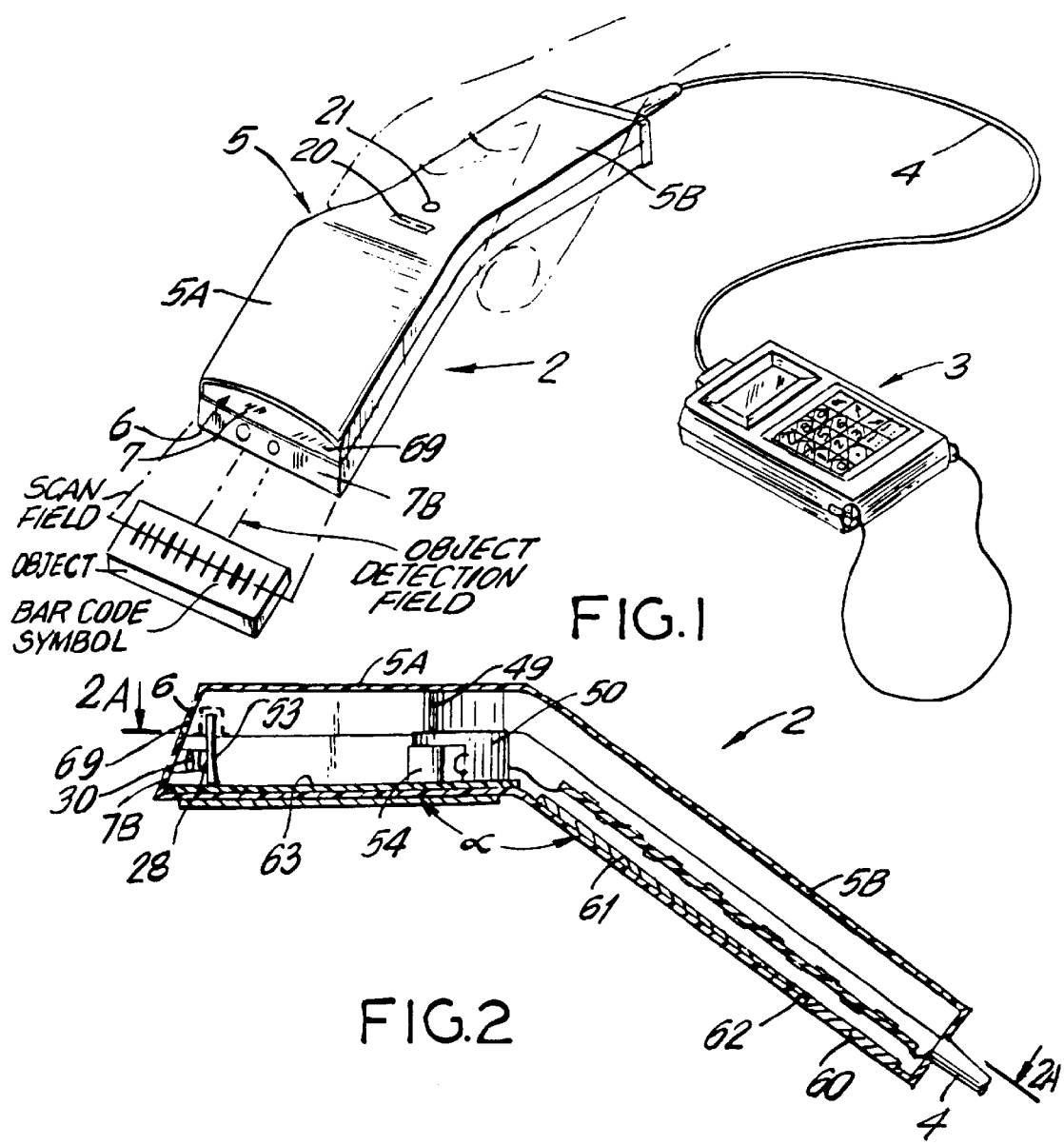
FIG.1
FIG.2
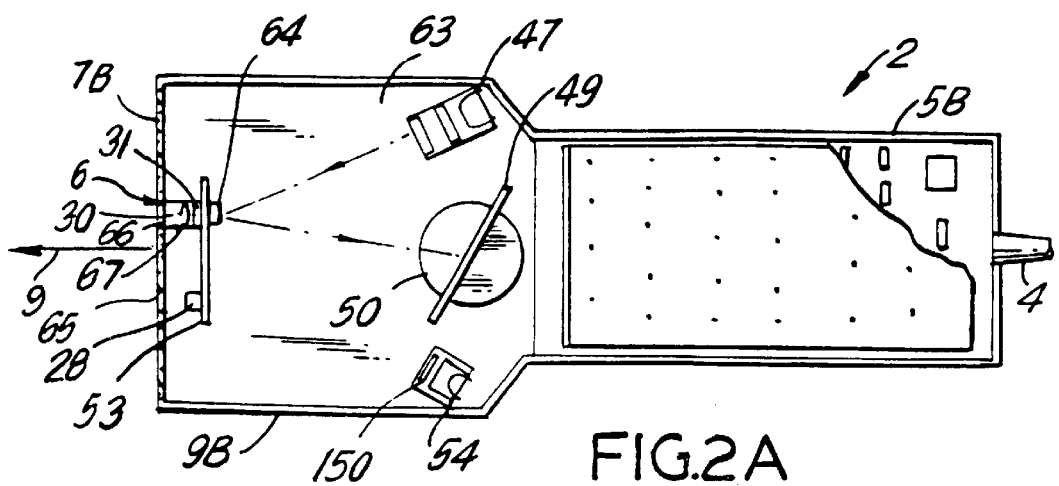
FIG.2A

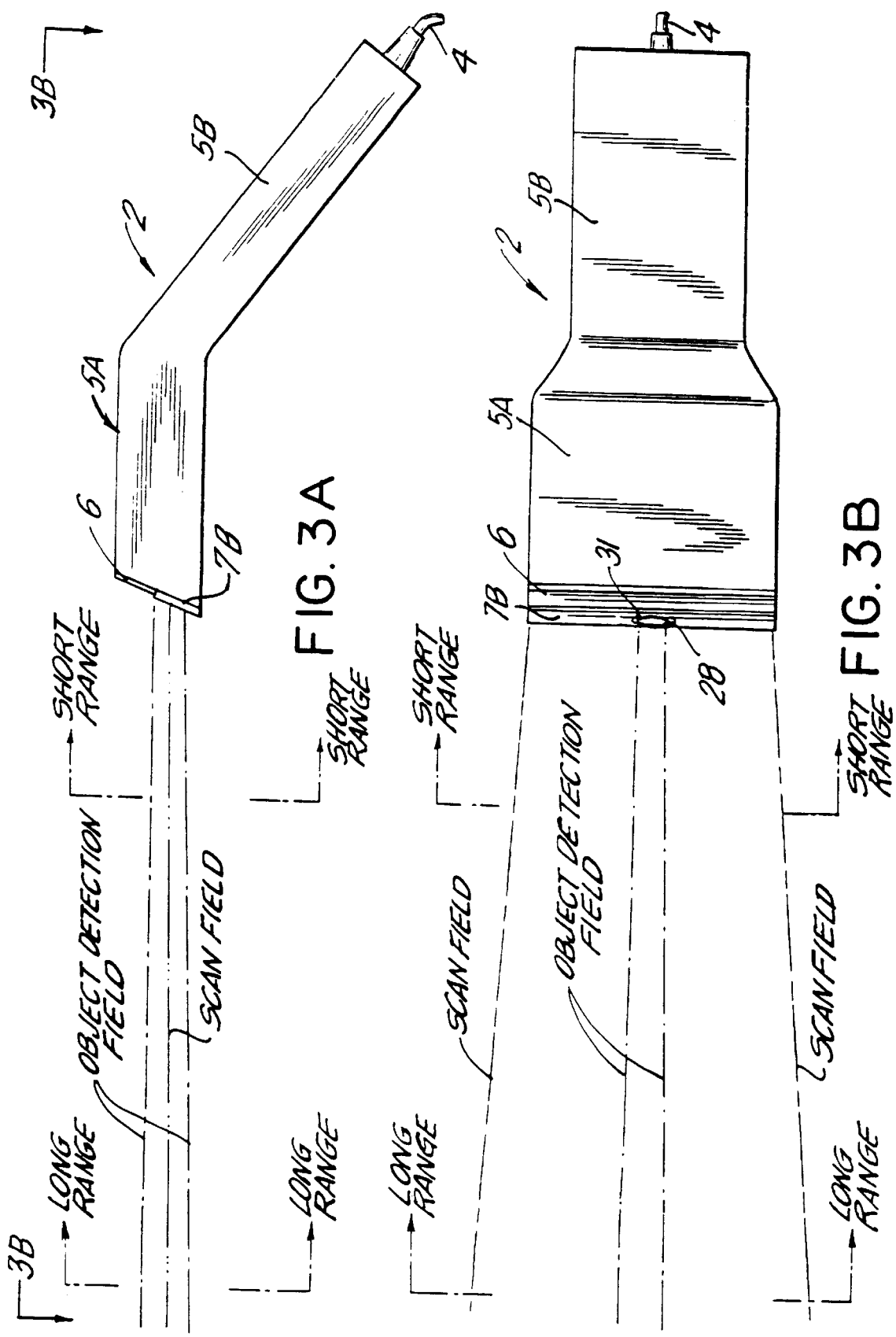

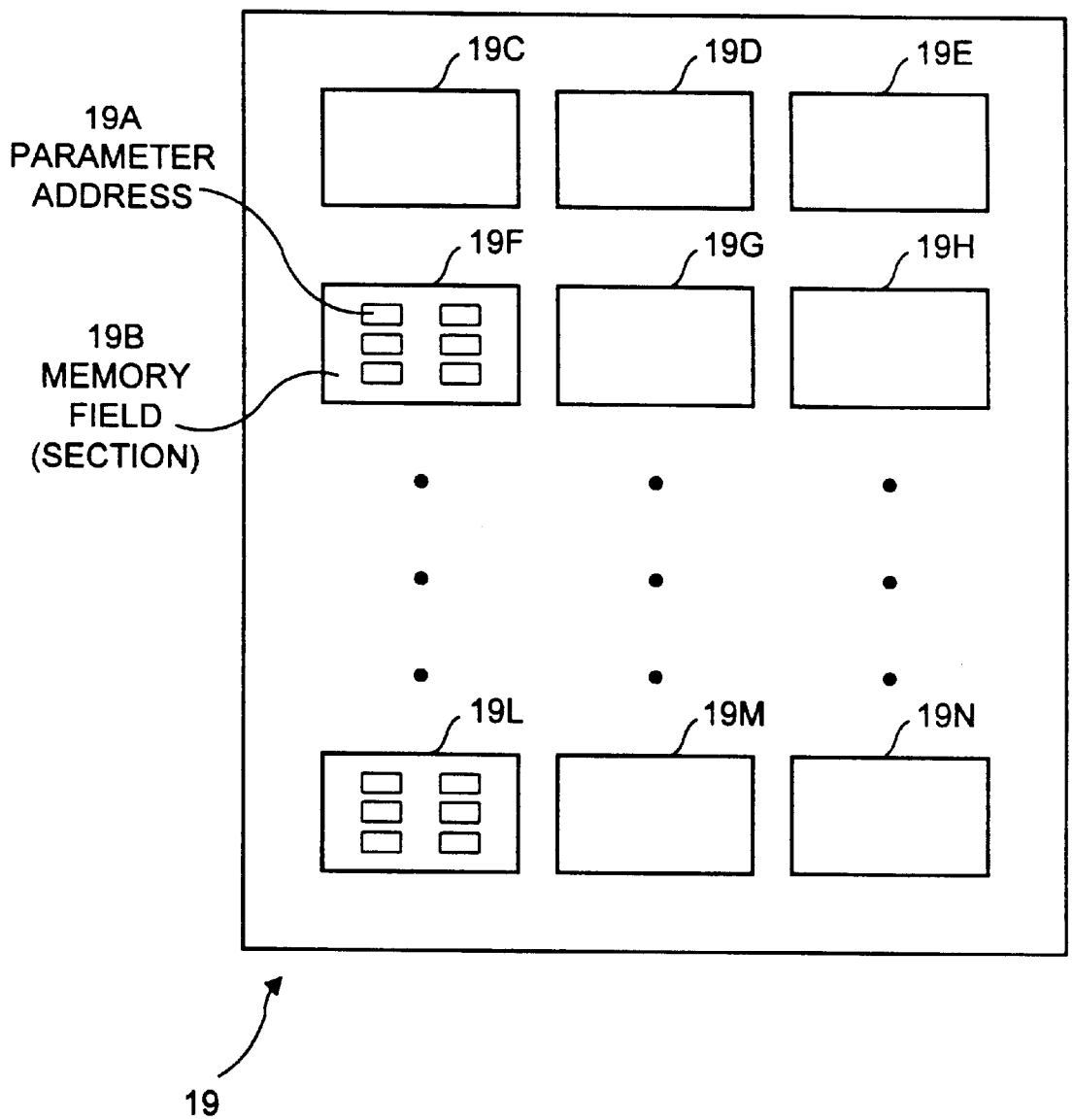
F I G. 7

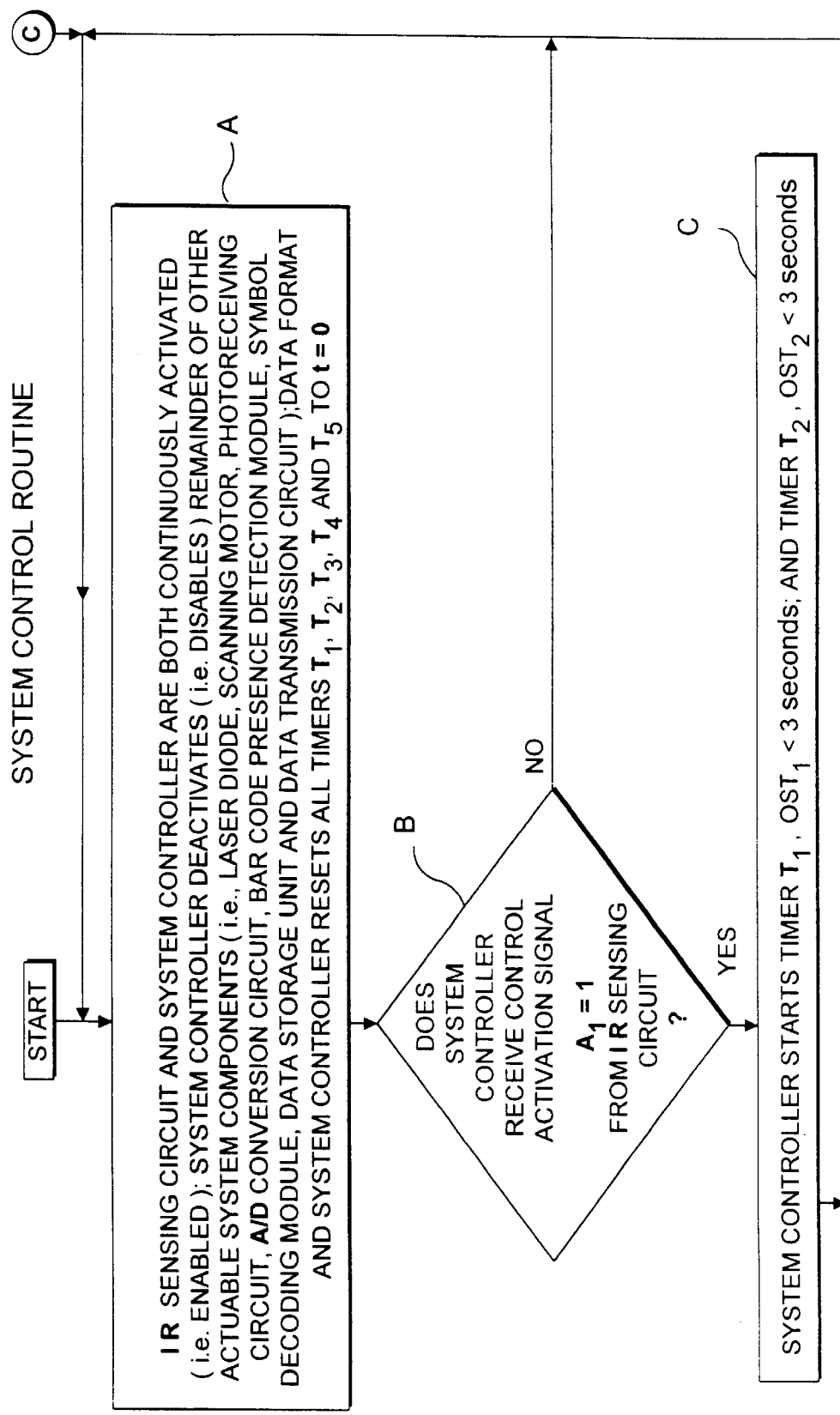
FIG. 16A1

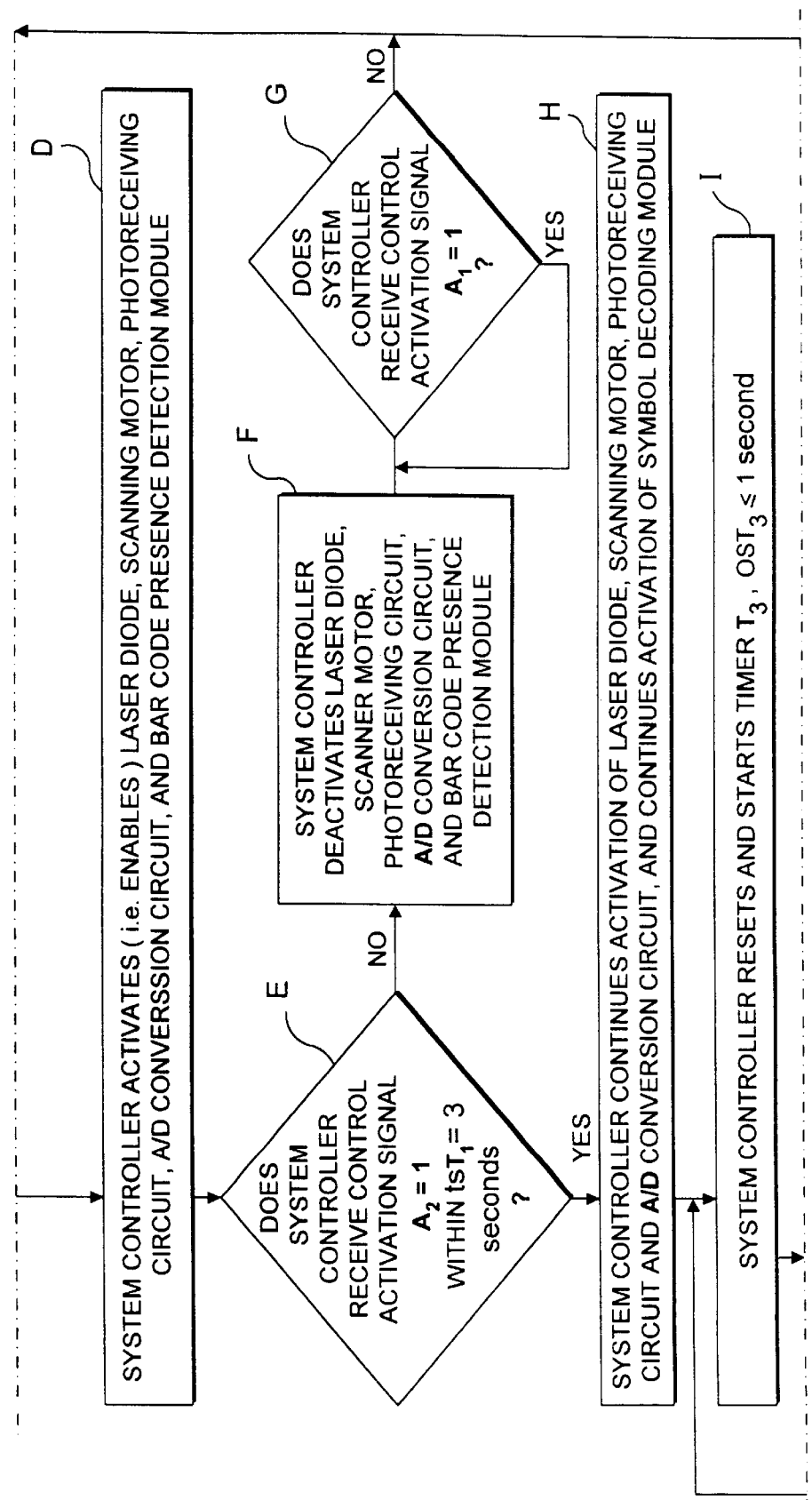
F I G. 16A2

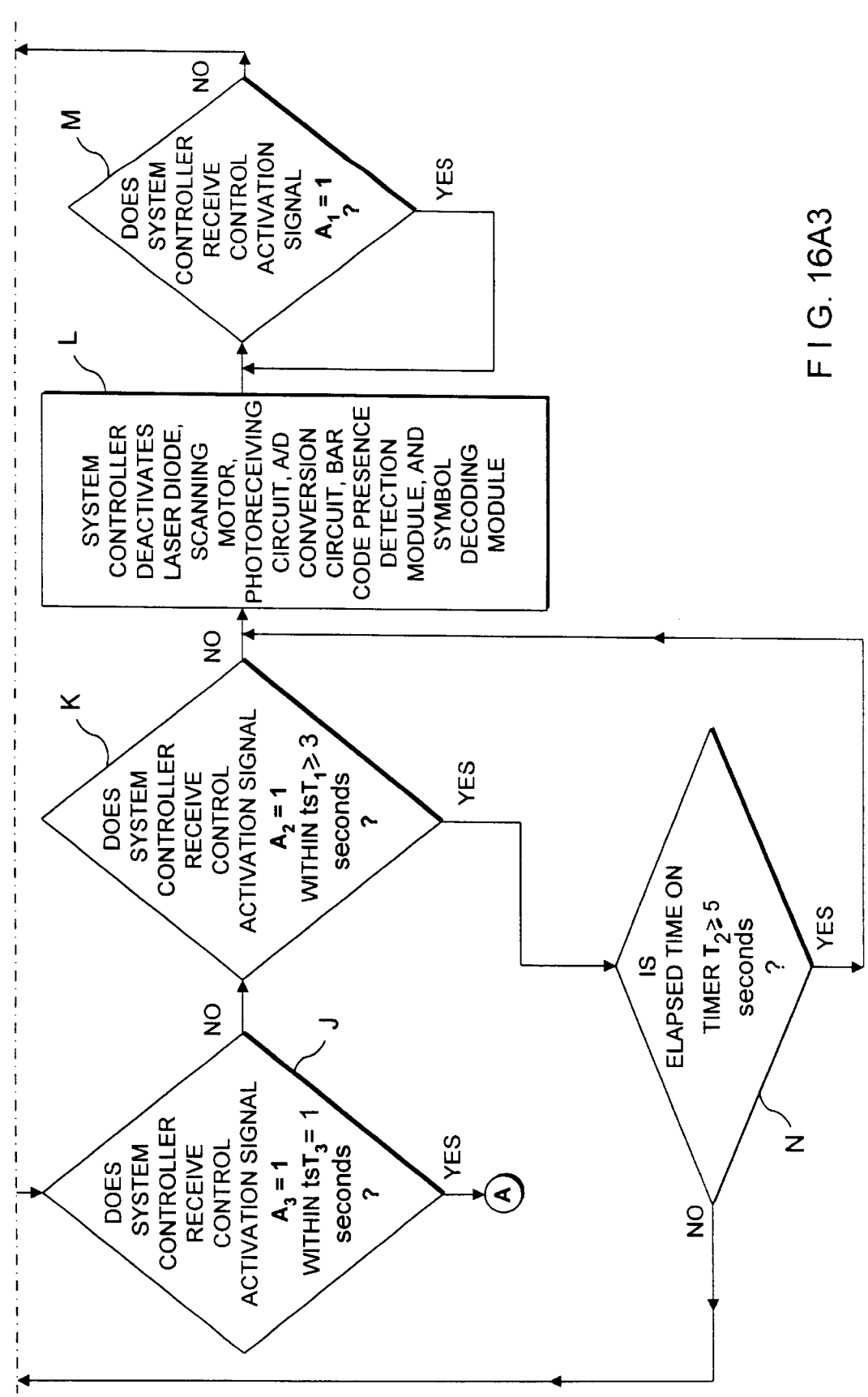
FIG. 16A3

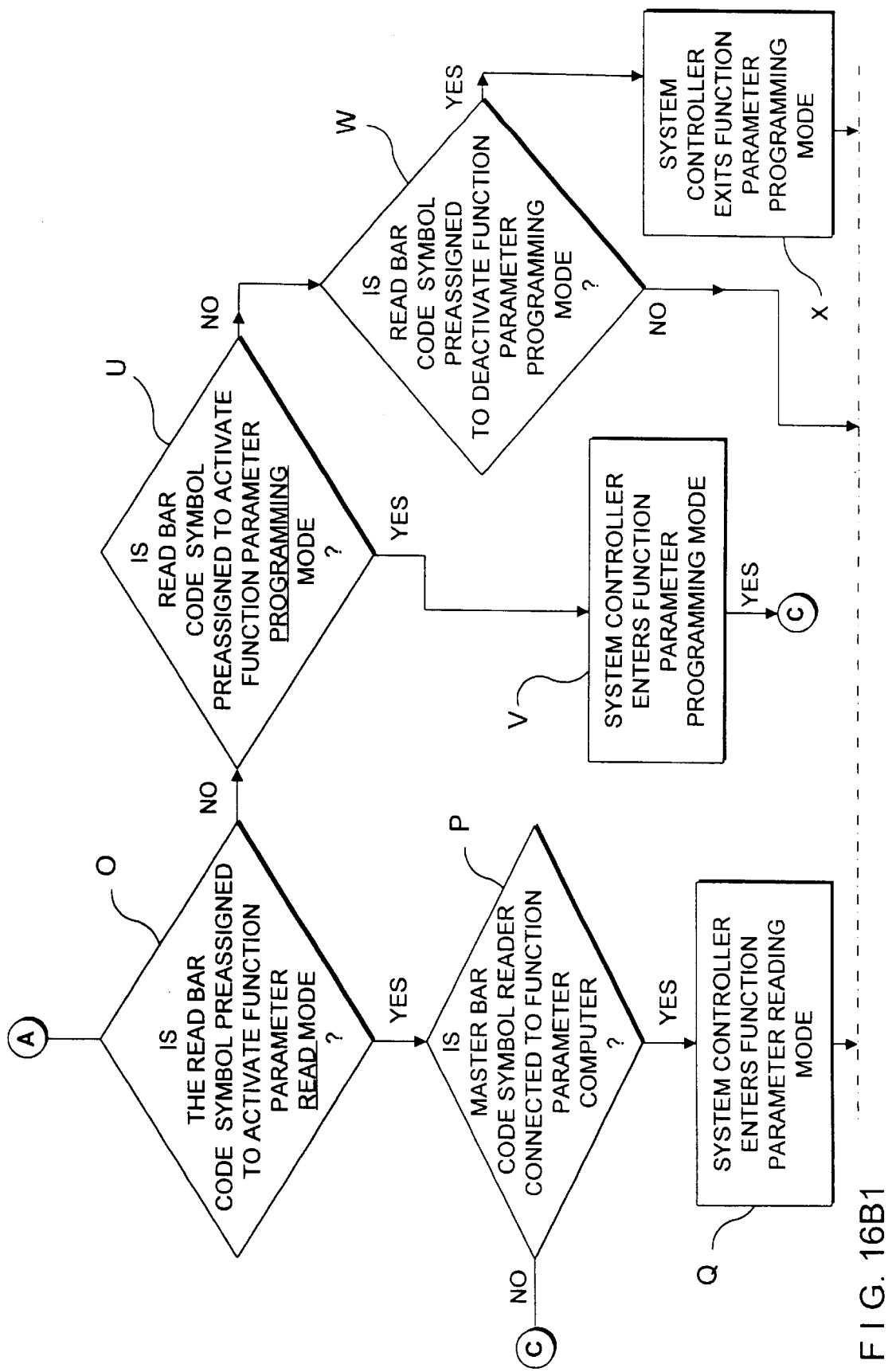
FIG. 16B1

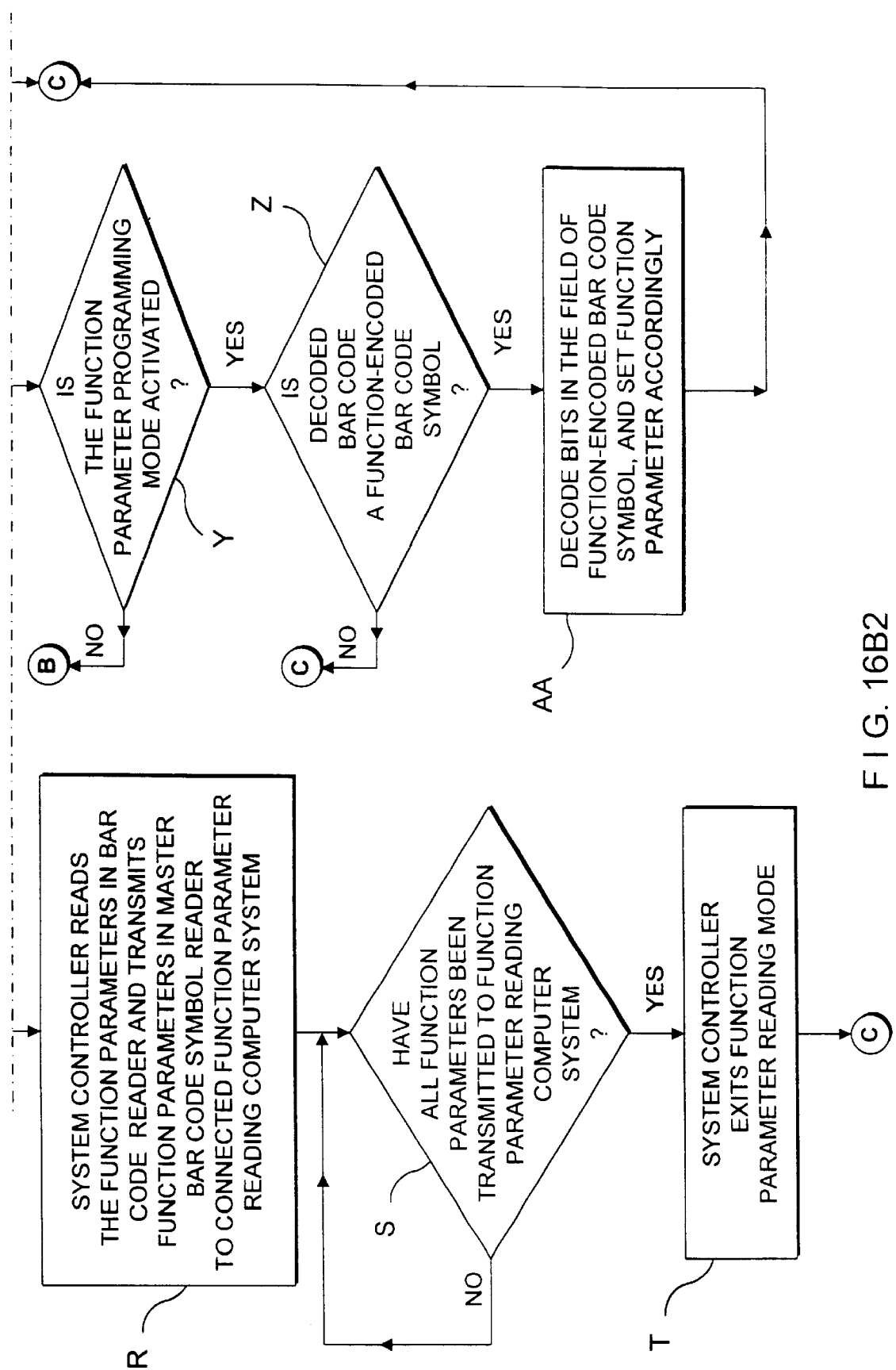
FIG. 16B2

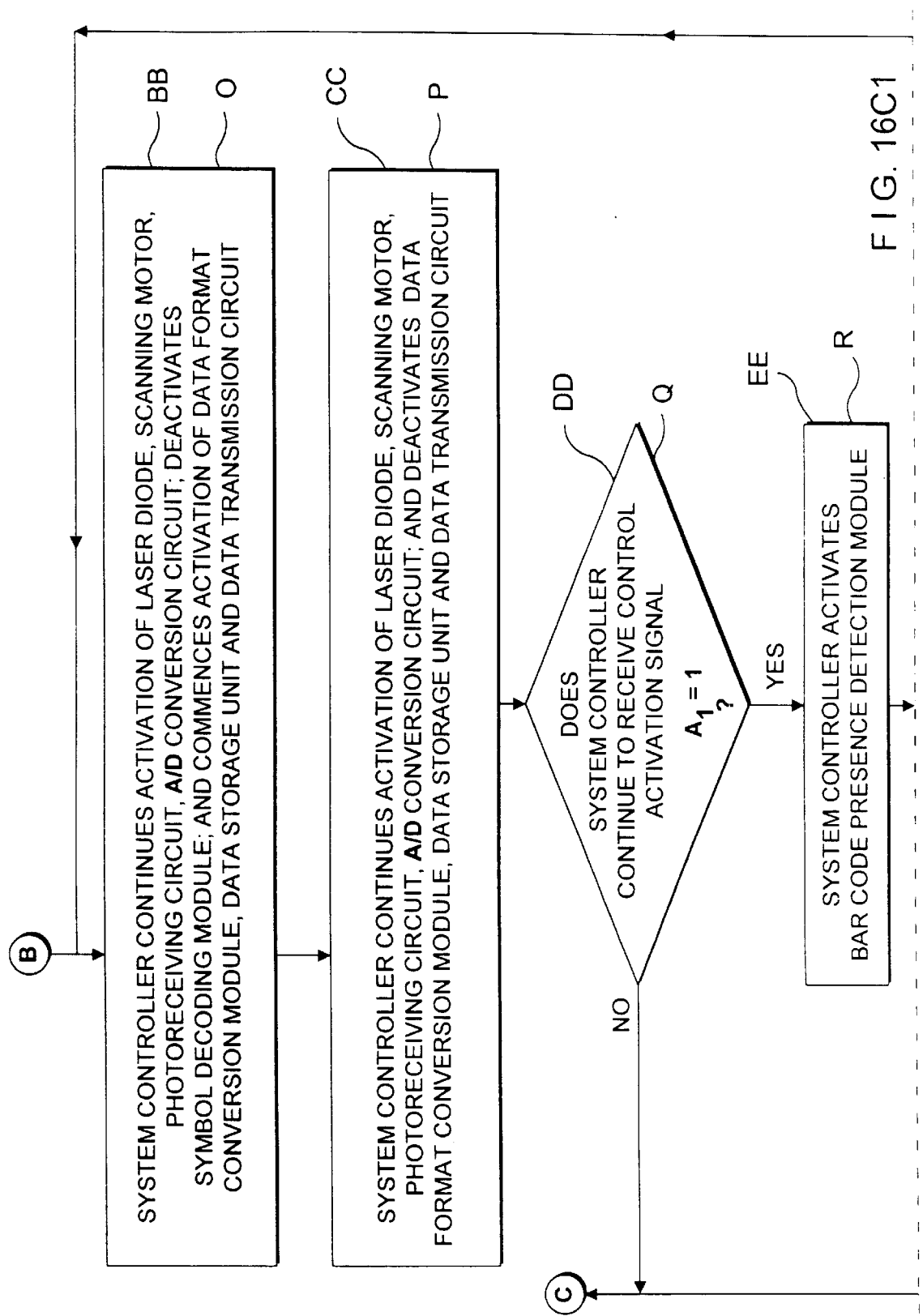

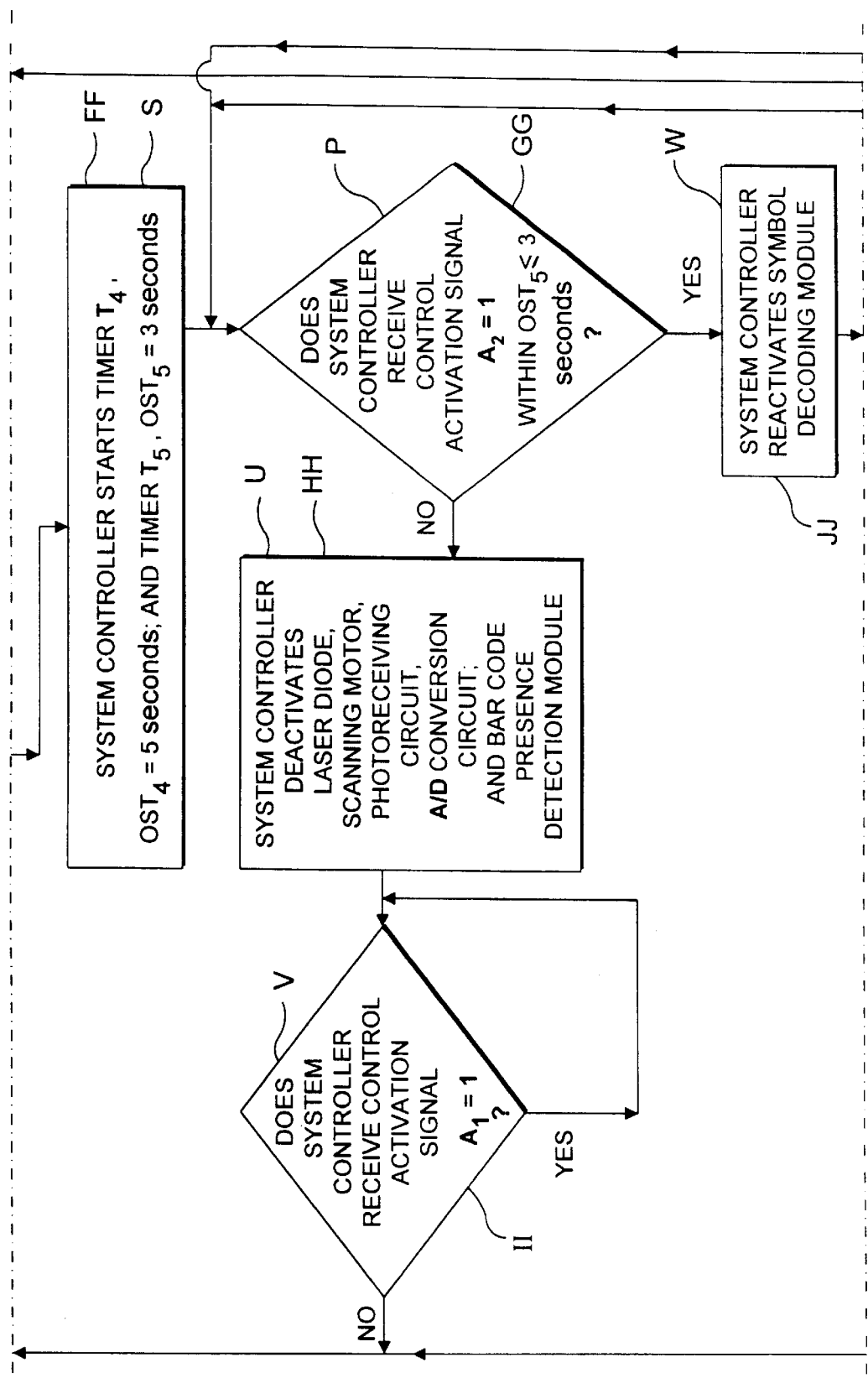
FIG. 16C2

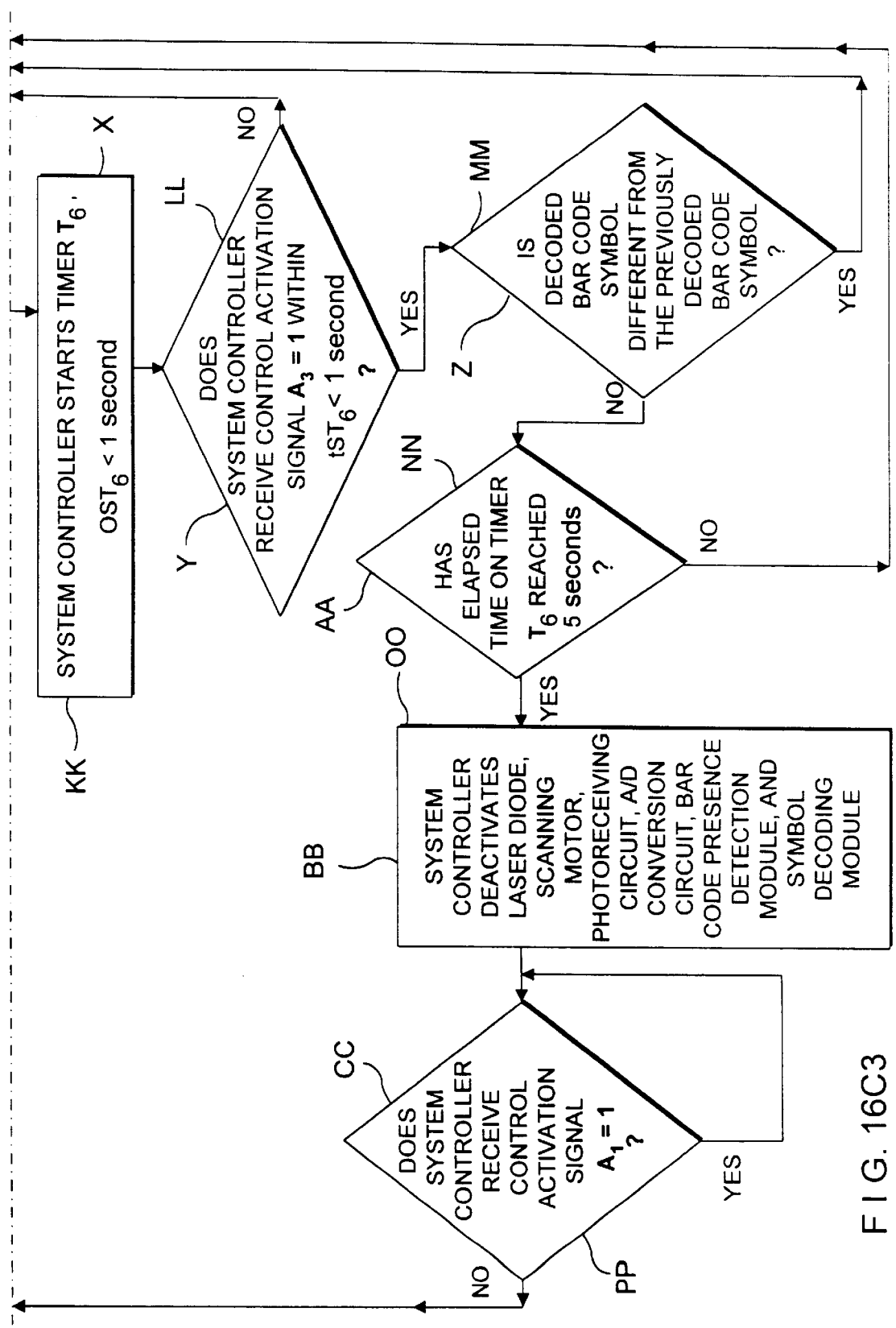
FIG. 16C3

METHOD AND APPARATUS FOR PROGRAMMING FUNCTIONAL SYSTEM PARAMETERS IN OPTICAL BAR CODE SCANNERS

RELATED CASES

The present Application is a Continuation of copending patent application Ser. No. 09/481,798 filed on Jun. 7, 1998 and entitled, "Method and Apparatus for Programming System", which is a Continuation of patent application Ser. No. 08/697,154 entitled, "Method and Apparatus for Programming System Function Parameters in Programmable Code Symbol Readers, filed on Aug. 21, 1996, now issued as U.S. Pat. No. 5,777,315, which is a Continuation of patent application Ser. No. 08/389,320 entitled "Method and Apparatus for Programming System Function Parameters in Programmable Code Symbol Readers", filed on Feb. 16, 1995. This Application is also a Continuation-in-Part of copending patent application Ser. No. 09/346,859 filed on Jul. 2, 1999, which is a Continuation-in-Part of 08/890,576 filed on Jul. 9, 1997 and entitled "Automatic Laser Scanning System and Method for Reading Bar Code Symbols Using the Same", which is a Continuation-in-Part of patent application Ser. No. 08/292,237, entitled "Automatic Bar Code Symbol System and Method of Reading Bar Code Symbols Using the Same", filed Aug. 17, 1994, and a continuation-in-part of application Ser. No. 08/293,695, entitled "Automatic Laser Scanning System and Method of Recording Bar Code Symbols Using Same", filed on Aug. 19, 1994, now issued as U.S. Pat. No. 5,468,951 which is a continuation of application Ser. No. 07/898,919; filed on Jun. 12, 1992, now U.S. Pat. No. 5,340,973. The present application is also a Continuation-In-Part of copending patent application Ser. No. 09/273,825 filed on Mar. 22, 1999 and entitled, "Method and Apparatus for Automatically Reading Bar Code Symbols" which is a Continuation-in-Part of copending application Ser. No. 08/293,493 entitled "Automatic Code Reading System Having Selectable Long-Range and Short-Range Modes of Operation" filed Aug. 19, 1994, now issued as U.S. Pat. No. 5,525,789; which is a continuation of application Ser. No. 07/761,123 filed Sep. 17, 1991, now U.S. Pat. No. 5,340,971. Each of these Applications is commonly owned by Meteorologic Instruments, Inc. and is incorporated herein by reference in its entirety.

BACKGROUND OF THE INVENTION

1. Field of the Invention

The present invention relates generally to novel techniques and devices for setting and/or adjusting various functional system parameters of programmable code symbol reading systems in a simple and convenient manner.

2. Brief Description of the Prior Art

Bar code symbol readers have gained popularity in recent years as they facilitate the quick and reliable identification of goods for various business, scientific and educational purposes.

In general, most bar code symbol reading systems provide various system functionalities that may be performed in a user-selectable manner. In a typical automatic hand-supportable bar code symbol reader, such as the Metrologic.TM. MS951 laser bar code symbol reader, the classes of system functions that are selectively available include: decode functions; supplemental functions; ITF symbol lengths; minimum symbol length; symbol length lock; communication mode selection; beeper operating characteristics; scanner definition and test modes; same symbol time-out; scanner functionality features; UPC formatting options; Non-UPC formatting options; depth-of field selections; etc.

Typically, great effort is undertaken to determine which set of system function parameters provides optimal performance in a given scanning environment (e.g., a particular point of sale (POS) station, inventory control environment, and the like). There is great motivation for finding and using such function parameters for any particular scanning application. The reason is clear: store managers need to use bar code symbol scanners that are configured for optimal scanning performance in a given scanning environment. This ensures that within a given time period, cashiers are able to safely scan the maximum number of goods under a particular set of working conditions. Typically, the determination of such system function parameters is carried out in beta or test sites, often under the supervision of application engineers and productivity experts.

Once a "master" or model bar code symbol reader is configured (i.e., programmed) to the satisfaction of productivity experts and application engineers, it is then desirable to duplicate (i.e., clone) the "master" bar code symbol reader a number of times. Oftentimes, the "cloned" bar code symbol readers are either situated of are to be used at remote locations far away from the master bar code symbol reader. This would be the case for a network of bar code symbol readers being used throughout a chain of retail department stores. By programming such bar code symbol readers in the same way, the store managers have a high degree of certainty that each configured bar code symbol reader will function substantially the same way, and thus ensure that a predictable level of scanner performance in a given working environment.

In most state-of-the-art bar code symbol readers, such as the Metrologic.TM. MS951 laser bar code symbol reader, the system functions are programmable by way of the microprocessor used in the realization of the bar code symbol reader. This is achieved by assigning a unique function parameter to each system function available in the bar code symbol reading system. In practice each available system function is assigned to a different memory structure in the programmable memory (NOVRAM) directly accessible by the microprocessor. Typically, one or several bits of memory are required for each programmable parameter assigned to each available system function. The collection of system parameters assigned to any particular bar code symbol reader is typically referred to as the "system configuration parameters" or "scanner configuration parameters" of the scanner or reader, as they specify the particular system function configuration into which the bar code symbol reader is programmed.

Presently, there are several known techniques for programming the system function parameters of a programmable bar code symbol reader.

The first function programming technique, disclosed in U.S. Pat. No. 4,825,058, involves programming each available system function into a "master" bar code symbol reader by reading a function-encoded bar code symbol printed on either a bar code symbol programming menu, or a sheet in a bar code symbol programming booklet. Typically, an "enter-programming-mode" bar code symbol is first read, to prepare the microprocessor for changing system functions in the bar code symbol reader. Thereafter, the function-encoded bar code symbol is read to effect the preprogramming of a corresponding system function parameter in its non-volatile memory. This process is repeated for each function to be programmed into the bar code symbol reader. To complete the process, an "exit-programming-mode" bar code symbol is read off the bar code symbol programming menu. When desiring to clone a master bar code symbol reader, the steps of the above technique must be repeated for each individual bar code symbol reader to be cloned. Consequently, this approach is time-consuming and laborious to carry our in practice.

A second function programming technique, disclosed in U.S. Pat. No. 4,868,375, involves connecting the communication port of the bar code symbol reader to be reconfigured, to the communication port of a host or programming computer system, and then sending function-encoded commands to the microprocessor in the connected bar code symbol reader. Each function-encoded command is then used by the microprocessor in order to reconfigure the function parameters in the non-volatile memory of the bar code symbol reader. When desiring to clone the configured bar code symbol reader using the above technique, the above procedure is repeated for each bar code symbol reader to be cloned therefrom. In situations where bar code symbol readers of interest are located in physically remote locations, this technique is difficult to practice without the use of expensive communications equipment.

In yet another technique, disclosed in U.S. Pat. No. 4,868,375, a number of bar code symbol scanners are each connected to a host computer system through a computer network. The system allows any configured (i.e., master) bar code symbol reader to transmit its system function parameters to any other bar code symbol scanner in the network in order to clone any other bar code symbol reader in the network. This approach is not only expensive and complicated to implement, but it does not provide a simple way to reconfigure a bar code symbol reader that is disconnected from such a computer network, or has no data communication channel therebetween.

In summary, the use of computer-based systems to program bar code symbol readers is not new and certainly, a number of approaches, as described above, have been proposed and used in practice in order to configure bar code symbol readers and scanners to diverse user requirements. However, prior art approaches have been less than desirable due to the short-comings and drawbacks described above.

Thus, there is a great need in the bar code symbol reading art for an improved way and means of configuring the system function parameters of programmable bar code symbol reading devices, while overcoming the shortcomings and drawbacks of prior art systems and methodologies.

OBJECTS AND SUMMARY OF THE INVENTION

Accordingly, it is a primary object of the present invention to provide a novel system and method of configuring the functional parameters of programmable code symbol scanning systems, while avoiding the shortcomings and drawbacks of prior art systems and methodologies.

Another object of the present invention is to provide such a system and method for use with any type of bar code symbol reading system, including laser-based system, flash-illumination based systems and CCD-based systems.

Another object of the present invention is to provide a novel system and method of programming the function parameters of programmable code symbol scanners, while avoiding the need to couple with the data communication port of the programmable code symbol reader to be configured.

A further object of the present invention is to provide a novel system and method of programming a bar code symbol reader, in which (i) the function-encoded parameters of a master bar code symbol reader are read using a computer-based function-parameter reading device having a memory contained therein for buffering real function parameters; (ii) the buffered function-encoded parameters are used to produce a list (i.e., ordered set) of function-encoded bar code symbols which are printed in a prespecified reading-sequence; and (iii) the list of printed function-encoded bar code symbols are read in the prespecified reading sequence in order so as to reconfigure (i.e., program) the bar code symbol reader with the same set of function-encoded parameters preprogrammed in the master bar code symbol reader.

A further object of the present invention is to provide such a system and method of programming a bar code symbol reader, in which data representative of the list of function-encoded bar code symbols is first transmitted from the function-parameter reading device to a remotely situated computer-based system, at which the list of function-encoded bar code symbols is printed prior to reconfiguring a bar code symbol reader by reading the same.

A further object of the present invention is to provide a novel system and method of programming a code symbol reader, in which (i) the function-encoded parameters of a master bar code symbol reader are read using a computer-based function-parameter reading device and subsequently buffered therein; (ii) the buffered function-encoded parameters are used to produce a list of symbol reading instructions for reading specific function-encoded symbols on particular pages of a preprinted bar code symbol programming guide; and (iii) the list of symbol reading instructions are used to read specified function-encoded bar code symbols printed on specified pages of the preprinted bar code symbol programming guide so as to reconfigure (i.e., program) the bar code symbol reader with the same set of function-encoded parameters preprogrammed in the master bar code symbol reader.

A further object of the present invention is to provide such a system and method of programming a bar code symbol reader, in which data representative of the list of symbol reading instructions is first transmitted from the buffer memory of the function parameter reading device to a remotely situated computer-based system, at which the list of symbol reading instructions is printed prior to reconfiguring a bar code symbol reader by reading the same.

These and other objects of the present invention will become apparent hereinafter and the claims.

BRIEF DESCRIPTION OF THE DRAWINGS

For a more complete understanding of the Objects of the Present Invention, the Detailed Description of the Illustrated Embodiments should be read in conjunction with the accompanying Drawings, wherein:

FIG. 1 is a perspective view of an automatic programmable hand-supportable laser bar code symbol reading device which may be used in conjunction with system and method of the present invention;

FIG. 2 is a cross-sectional elevated side view along the longitudinal extent of the automatic bar code symbol reading device of FIG. 1, showing various hardware and software components used in realizing the same;

FIG. 2A is a cross-sectional plan view along the longitudinal extent of the automatic programmable bar code symbol reading device taken along line 2A—2A of FIG. 2, also showing the various components used in realizing the device;

FIG. 3A is an elevated side view of the programmable bar code reading device of the present invention, illustrating the spatial relationship between the object detection and scan fields of the device, and the programmable long and short ranges of programmed object detection and bar code presence detection;

FIG. 3B is a plan view of the automatic programmable bar code reading device taken along line 3A—3A of FIG. 3, also illustrating the spatial relationship between the object detection and scan fields of the device and the programmable long and short ranges of object and bar code presence detection;

FIG. 7 is a schematic representation of the memory structure of the function-parameter storage memory in the programmable bar code symbol reading device of FIG. 1;

FIGS. 16A through 16C, taken together, show a high level flow chart of a system control program (i.e., Main System Control Routine) illustrating various courses of programmed system operation that the automatic bar code symbol reading device may undergo during bar code symbol reading operations, as well as during function-parameter programming and acquisition operations.

DETAILED DESCRIPTION OF THE ILLUSTRATED EMBODIMENTS

Figure 4:
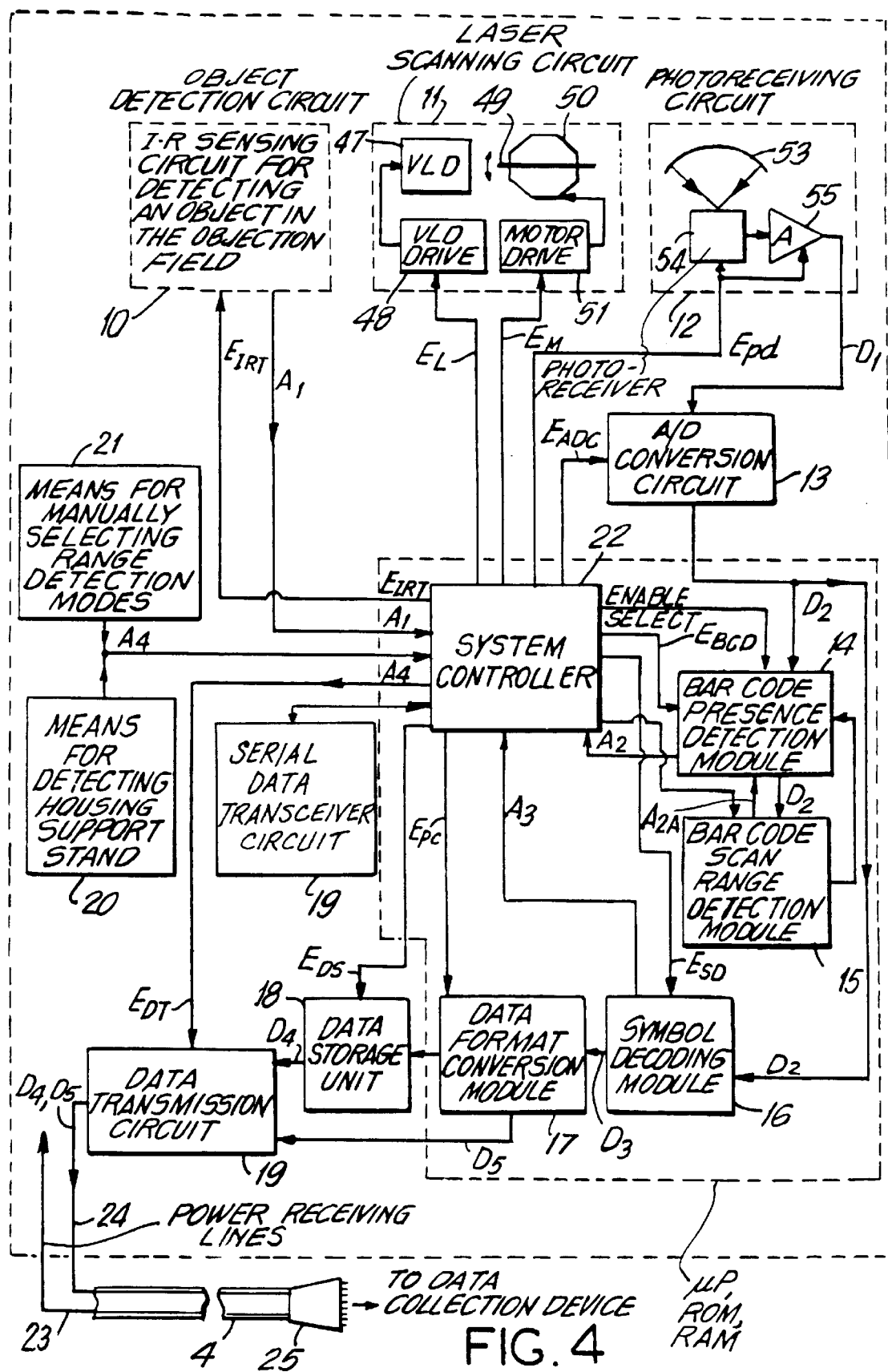
FIG. 4 is block functional system diagram of the automatic programmable bar code symbol reading device of FIG. 1, illustrating the principal components of the device integrated with the control system thereof.

In FIG. 1, the automatic programmable bar code symbol reading system of the present invention is illustrated. As shown, automatic bar code symbol reading system 1 comprises an automatic hand-supportable bar code symbol reading device 2 operably associated with hand-supportable data collection device 3 of the present invention. Operable interconnection of bar code symbol reading device 2 and data collection device 3 is achieved by a flexible multi-wire connector cord 4 extending from bar code symbol device 2 and plugged directly into the serial data-input communications port of the data collection device 3. Alternatively, such an interface may be achieved using the wireless Radio-Frequency (RF) scanner interface disclosed in copending application Ser. No. 08/292,237 filed Aug. 17, 1995, and incorporated herein by reference in its entirety. A detailed description of the structure, functions and operation of the data collection device 3 is found in U.S. Pat. No. 5,340,971, issued to Meteorologic Instruments, Inc. on Aug. 23, 1994, also incorporated herein by reference.

As shown in FIGS. 1 through 3A, automatic bar code symbol reading device 2 comprises an ultra lightweight hand-supportable housing 5 having a head portion 5A that continuously extends into a contoured handle portion 5B at an obtuse deflection angle which can be in the range of 150 to about 170 degrees. In a preferred embodiment, deflection angle a is about 160 degrees. This ergonomic housing design is sculpted (i.e., form-fitted) to the hand, making scanning as easy and effortless as a wave of the hand. At the same time, this feature eliminates risks of musculoskeletal disorders, such as carpal tunnel syndrome, which can result from repeated biomechanical stress commonly associated with pointing prior art gun-shaped scanners at a bar code, squeezing the trigger to activate the scanning beam, and then releasing the trigger.

As illustrated in FIGS. 1 through 3A, the head portion of housing 5 has a transmission aperture 6 formed in upper portion of front panel 7, to permit desired optical radiation to exit and enter the housing, as will be described in detail hereinafter. The lower portion of front panel 7B is optically opaque, as are all other surfaces of the hand-supportable housing.

As illustrated in FIGS. 1, 3 and 3A in particular, automatic bar code reading device 2 generates two different fields external to the hand-supportable housing, in order to carry out automatic bar code symbol reading according to the principles of the present invention. Specifically, an object detection field, indicated by broken and dotted lines, is provided externally to the housing for detecting energy reflected off an object bearing a bar code, located within the object detection field. A scan field, on the other hand, having at least one scanning plane of essentially planar extent, is provided external to the housing for scanning an object present within the scan field. Such scanning is achieved with a light beam so that scan data can be collected for detecting the presence of a bar code within the scan field, and for subsequently reading (i.e., scanning and decoding) the detected bar code symbol.

In general, the energy reflected of an object in the object detection field can be optical radiation or acoustical energy, either sensible or non-sensible by the operator, and may be either generated by an external ambient source, or from the automatic bar code symbol reading device itself. In the illustrative embodiments, this energy is a beam of infrared light projected forwardly from transmission aperture 6 in a spatially directed fashion, preferably essentially parallel to the longitudinal axis 8 of the head portion of the housing. In a preferred embodiment, the object detection field has a three-dimensional volumetric expanse spatially coincident with the transmitted infrared light beam. This ensures that an object within the object detection field will be illuminated by the infrared light beam and that infrared light reflected therefrom will be directed generally towards the transmission aperture of the housing where it can be detected, to indicate that an object is within the object detection field.

In order to scan a bar code symbol on the object within the object detection field, a light beam is automatically generated within the head portion of the housing and repeatedly scanned through the transmission aperture across the scan field. As illustrated in FIG. 1, at least a portion of the scanned light beam aligned with bar code on the detected object, will be reflected off the bar code and directed back towards and through the transmission aperture for collection, detection and subsequent processing in a manner which will be described in detail hereinafter. To ensure that the bar code symbol on the detected object is easily scanned by the scanning light beam, the object detection field is designed to spatially encompass at least a portion of the scan field along the operative scanning range of the device, as illustrated in FIGS. 3A and 3B.

To more fully appreciate the mechanisms employed in providing the object detection and scan fields of bar code symbol reading device 2, reference is best made to the operative elements within the hand-supportable housing.

As shown in FIG. 4, bar code symbol reading device of the first illustrated embodiment comprises a number of system components, namely, an object detection circuit 9, scanning means 10, photoreceiving circuit 11, analog-to-digital (A/D) conversion circuit 12, bar code presence detection module 13, bar code scan range detection module 14, symbol decoding module 15, data format conversion module 16, symbol character data storage unit 17, function parameter storage memory (i.e., EPROM) 18, and serial data transceiver circuit 19. In addition, a magnetic field sensing circuit 20 is provided for detecting housing support stand, while a manual switch 21 is provided for selecting long or short range modes of object and bar code presence detection. As illustrated, these components are operably associated with a programmable system controller 22 which provides a great degree of versatility in system control, capability and operation. The structure, function and advantages of this controller will be described in detail hereinafter.

In the illustrated embodiment, system controller 22, bar code presence detection module 14, bar code scan range detection module 15, symbol decoding module 16, and data format conversion module 17 are realized using a single programmable device, such as a microprocessor having accessible program and buffer memory, and external timing means. It is understood, however, that any of these elements can be realized using separate discrete components as will be apparent to those skilled in the art.

In the illustrative embodiment, automatic bar code symbol reading device 2 also includes power receiving lines 23 which lead to conventional power distribution circuitry (not shown) for providing requisite power to each of the system components, when and for time prescribed by the system controller. As illustrated, power receiving lines 23 are provided within the encasing of flexible connector cord 4, run alongside data communication lines 24 of the device, and are thus physically associated with a multi-pin connector plug 25 at the end of the flexible connector cord. An on/off power switch or functionally equivalent device may be provided external the hand-supportable housing to permit the user to energize and de-energize the device. In the illustrative embodiment, power delivered through the connector cord to the bar code symbol reading device is continuously provided to system controller 22 and object detection circuit 10 to continuously enable their operation, while only biasing voltages and the like are provided to all other system components. In this way, each remaining system component is initially deactivated (i.e., disabled) from operation and must be activated (i.e., enabled) by the system controller. In the embodiment disclosed in copending application Ser. No. 08/292,237, flexible connector cord 4 can be eliminated replaced by RF signal transmission circuitry and a miniature internally disposed power supply as described therein.

The purpose of the object detection circuit is to determine (i.e., detect) the presence of an object (e.g., product, document, etc.) within the object detection field of bar code symbol reading device 2, and in response thereto, automatically produce first control activation signal A.sub.1. In turn, first control activation signal A.sub.1 is provided as input to the system controller which, as will be described in greater detail hereinafter, causes the device to undergo a transition to the bar code symbol presence detection state. In FIGS. 5A and 5B, two different approaches to detecting the presence of an object within the object detection field are disclosed.

Figure 5:
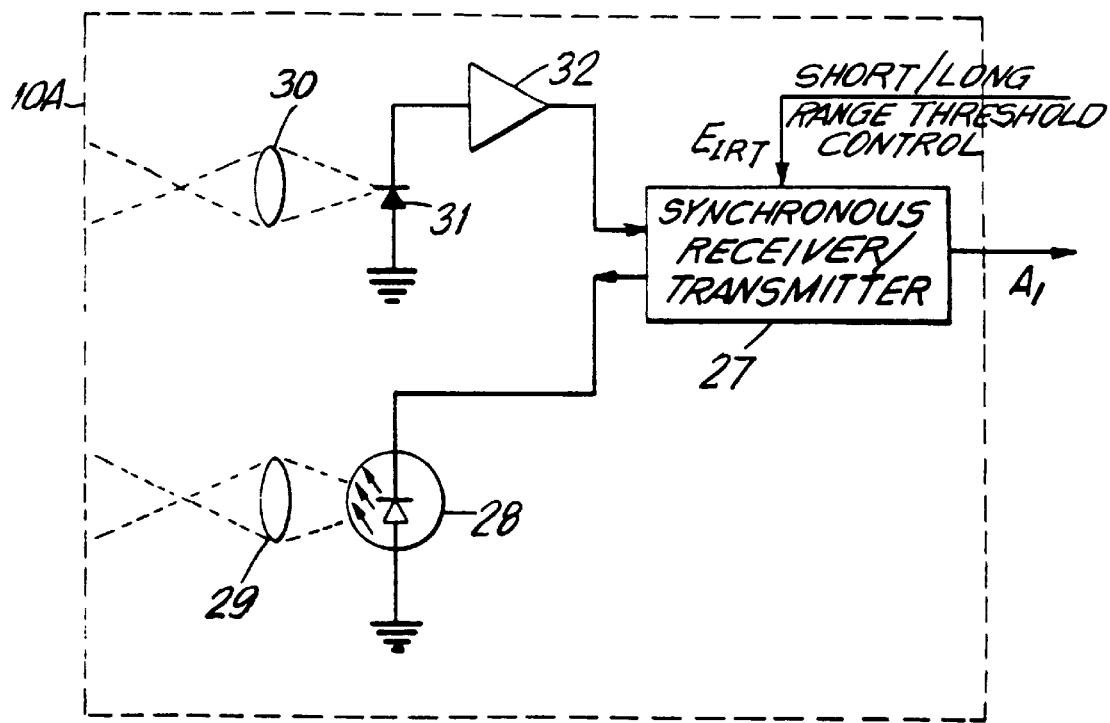
FIG. 5 is a block functional diagram of a first embodiment of the object detection means of the automatic programmable bar code symbol reading device of the present invention.

In FIG. 5, an "active" object detection circuit 10A is shown. In essence, this circuit operates by transmitting an infrared (IR) light signal forwardly into the object detection field. First control activation signal A.sub.1 is generated upon receiving a reflection of the transmitted signal off an object within the object detection field. As illustrated, object detection circuit 10A is realized as an IR sensing circuit which comprises a synchronous receiver/transmitter 27 and an infrared LED 28 that generates a 940 nanometer pulsed signal at a rate of 2.0 KHZ. This pulsed IR signal is transmitted through focusing lens 29 to illuminate the object detection field. When an object is present within the object detection field, a reflected pulse signal is produced and focused through focusing lens 30 onto photodiode 31. Notably, the light collecting (i.e., optical) characteristics of focusing lens 30 and aperture will essentially determine the geometric characteristics of the object detection field. Consequently, the optical characteristics of lens 30 and aperture will be selected to provide an object detection field which spatially encompasses at least a portion of the scanning field along the operative scanning range of the device. The output of photodiode 31 is converted to a voltage by current-to-voltage amplifier 32, and the output thereof is provided as input to synchronous receiver/transmitter 27 which to synchronously compares the received signal with the transmitted signal and determines if an object is present in the object detection field. If so, then synchronous receiver/transmitter 27 produces first control activation signal $A_1=1$, indicative of such condition. Upon generation of first control activation signal $A_1=1$, the system controller will activate the operation of scanning means 11, photoreceiving circuit 12, A/D conversion circuit 13 and bar code presence detection module 14 according to a preprogrammed system control routine, the details of which will be described hereinafter.

Figure 6:
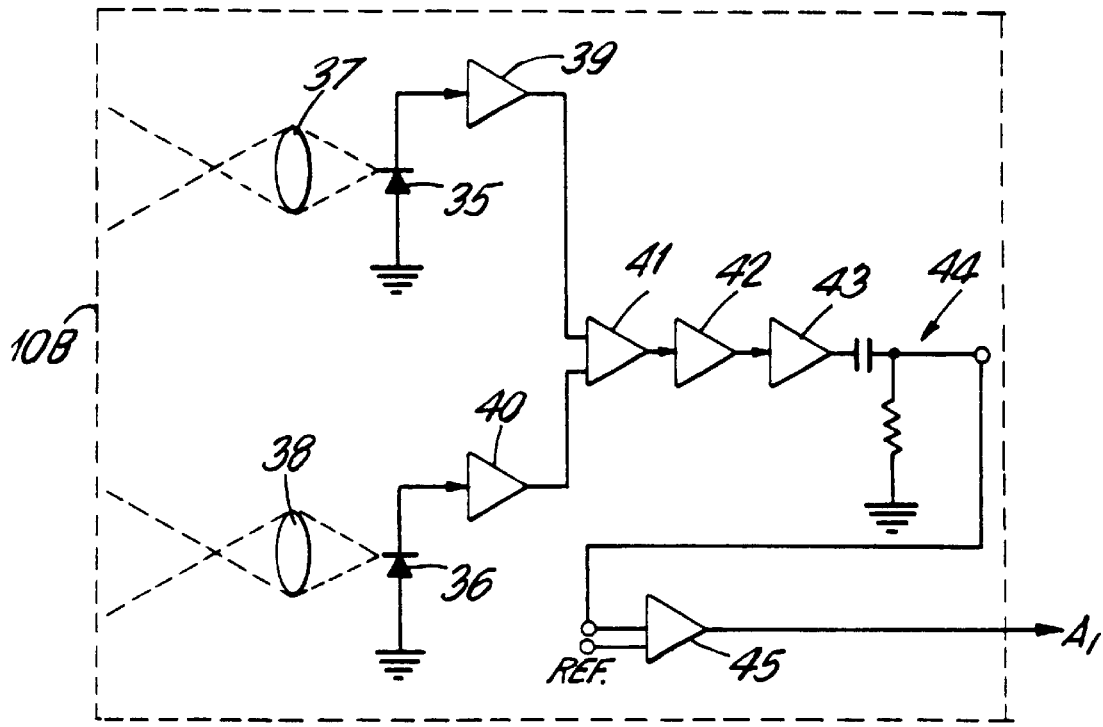
FIG. 6 is a block functional diagram of a second embodiment of the object detection means of the programmable bar code symbol reading device.

In FIG. 6, a passive object detection circuit 10B is shown. In essence this circuit operates by passively detecting ambient light within the object detection field. First control activation signal $A_1$ is generated upon receiving light of different intensity reflected off an object within the object detection field. As illustrated object detection circuit 10B is realized as a passive ambient light detection circuit which comprises a pair of photodiodes 35 and 36, that sense ambient light gathered from two spatially overlapping parts of the object detection field using focusing lenses 37 and 38, respectively. Notably, the optical characteristics of focusing lenses 37 and 38 will essentially determine the geometric characteristics of the object detection field. Consequently, the optical characteristics of these lenses will be selected to provide an object detection field which spatially encompasses at least a portion of the scanning field along the operative scanning range of the device. The output signals of photodiodes 35 and 36 are converted to voltages by current-to-voltage amplifiers 39 and 40 respectively, and are provided as input to a differential amplifier 41. The output of differential amplifier 41 is provided as input to a sample and hold amplifier 42 in order to reject 60 and 120 Hz noise. Output signal of amplifier 42 is provided as input to a logarithmic amplifier 43 to command signal swing. The output signal of logarithmic amplifier 43 is provided as input to a differentiator 44 and then to a comparator 45. The output of comparator 45 provides first control activation signal $A_1$.

Alternatively, automatic bar code symbol reading device hereof can be readily adapted to sense ultrasonic energy reflected off an object present within the object detection field. In such an alternative embodiment, object detection circuit 10 is realized as an ultrasonic energy sensing mechanism. In housing 5, ultrasonic energy is generated and transmitted forwardly of the housing head portion into the object detection field. Then, ultrasonic energy reflected off an object within the object detection field is detected closely adjacent the transmission window using an ultrasonic energy detector. Preferably, a focusing element is disposed in front of the detector in order to effectively maximize collection of reflected ultrasonic energy. In such instances, the focusing element will essentially determine the geometrical characteristics of the object detection field of the device. Consequently, as with the other above-described object detection circuits, the energy focusing (i.e., collecting) characteristics of the focusing element will be selected to provide an object detection field which spatially encompasses at least a portion of the scan field.

For purposes of illustration, object detection circuit 10A shown in FIG. 5, is provided with two different modes of operation, namely, a long range mode of object detection and a short range mode of object detection. As shown in FIG. 4, these modes are set by the system controller using mode enable signals $E_{IRT}=0$ and $E_{IRT}=1$, respectively. When induced into the long range mode of operation, the IR sensing circuit (i.e., object detection means) will generate first control activation signal $A_1=1$ whenever an object within the object detection field has been detected, despite the particular distance the object is located from the transmission aperture. When induced into the short range mode operation, the IR sensing circuit will generate first activation control signal $A_1=1$ only when an object is detected at a distance within the short range of the object detection field. The long range specification for object detection is preselected to be the full or entire range of sensitivity provided by IR sensing circuit 10A (e.g., 0 to about 10 inches), which is schematically indicated in FIGS. 3A and 3B. In the preferred embodiment, the short range specification for object detection is preselected to be the reduced range of sensitivity provided by the IR sensing circuit when mode enable signal $E_{IRT}=1$ is provided to the desensitization port of receiver/transmitter 27 in FIG. 5. In an illustrated embodiment, the short range of object detection is about 0 to about 3 inches or so, as schematically indicated in FIGS. 3 and 3A, to provide CCD-like scanner emulation. As will become apparent hereinafter, the inherently limited depth of field and width of field associated with the short range mode of object detection prevents, in essence, the scanning means 11 from flooding the scan field with laser scanning light and inadvertently detecting undesired bar code symbols. The particular uses to which object detection range selection can be put, are described in great detail in U.S. Pat. No. 5,340,971.

As illustrated in FIG. 4, scanning means 11 comprises a light source 47 which, in general, may be any source of intense light (e.g., laser light) suitably selected for maximizing the reflectively from the object's surface bearing the bar code symbol. In the illustrative embodiment, light source 47 comprises a solid-state visible laser diode (VLD) which is driven by a conventional driver circuit 48. In the illustrative embodiment, the wavelength of visible laser light produced from laser diode 47 is about 670 nanometers. In order to scan the laser beam output from laser diode 47 over a scan field having a predetermined spatial extent in front of the head portion of the housing, a planar scanning mirror 49 can be oscillated back and forth by a stepper motor 50 driven by a conventional driver circuit 51, as shown. However, one of a variety of conventional scanning mechanisms may be alternatively used with excellent results.

To selectively activate laser light source 47 and scanning motor 50, the system controller provides laser diode enable signal $E_L$ and scanning motor enable signal $E_M$ as input to driver circuits 48 and 51, respectively. When enable signal $E_L$ is a logical "high" level (i.e., $E_L=1$), a laser beam is generated, and when $E_M$ is a logical high level the laser beam is scanned through the transmission aperture and across the scan field.

When an object, such as product bearing a bar code symbol, is within the scan field at the time of scanning, the laser beam incident thereon will be reflected. This will produce a laser light return signal of variable intensity which represents a spatial variation in light reflectivity characteristic of the spaced apart pattern of bars (and spaces) comprising the bar code symbol. Photoreceiving circuit 12 is provided for the purpose of detecting at least a portion of laser light of variable intensity, which is reflected off the object and bar code symbol within the scan field. Upon detection of this scan data signal, photoreceiving circuit 12 produces an analog scan data signal $D_1$ indicative of the detected light intensity.

As shown in FIG. 2A, photoreceiving circuit 12 comprises scan data collection mirror 53 which focuses received optical scan data signals for subsequent detection by a photoreceiver 54 having, mounted in front of its sensor, a wavelength selective filter 150 which only transmits optical radiation of wavelengths up to a small band above 670 nanometers. Photoreceiver 54, in turn, produces an analog signal which is subsequently amplified by preamplifier 55 to produce analog scan data signal $D_1$. In combination, scanning means 11 and photoreceiving circuit 12 cooperate to generate scan data signals from the scan field, over time intervals specified by the system controller. As will illustrated hereinafter, these scan data signals are used by bar code presence detection module 14, bar code scan range detection module 15 and symbol decoding module 16.

As illustrated in FIG. 4, analog scan data signal $D_1$ is provided as input to A/D conversion circuit 13. As is well known in the art, A/D conversion circuit 13 processes analog scan data signal $D_1$ to provide a digital scan data signal $D_2$ which resembles, in form, a pulse width modulated signal, where logical "1" signal levels represent spaces of the scanned bar code and logical "0" signal levels represent bars of the scanned bar code. A/D conversion circuit 13 can be realized by any conventional A/D chip. Digitized scan data signal $D_2$ is provided as input to bar code presence detection module 14, bar code scan range detection module 15 and symbol decoding module 16.

The purpose and function of bar code presence detection module 14 is to determine whether a bar code is present in or absent from the scan field over time intervals specified by the system controller. When a bar code symbol is detected in the scan field, the bar code presence detection module 14 automatically generates second control activation signal $A_2$ (i.e., $A_2=1$) which is provided as input to the system controller, as shown in FIG. 4. Preferably, bar code presence detection module 14 is realized as a microcode program carried out by the microprocessor and associated program and buffer memory, described hereinbefore. The function of the bar code presence detection module is not to carry out a decoding process but rather to simply and rapidly determine whether the received scan data signals produced during bar code presence detection, represent a bar code symbol residing within the scan field. There are many ways in which to achieve this through a programming implementation.

In the illustrative embodiment, the aim of bar code presence detection module 14 is to simply detect a bar code symbol "envelope". This is achieved by first processing a digital scan data signal $D_2$ so as to produce digitized "count" data and digital "sign" data. The digital count data is representative of the measured time interval (i.e., duration) of each signal level between detected signal level transitions which occur in digitized scan data signal $D_2$. The digital sign data, on the other hand, indicates whether the signal level between detected signal level transitions is either a logical "1", representative of a space, or a logical "0", representative of a bar within a bar code symbol. Using the digital count and sign data, the bar code presence detection module then determines in a straightforward manner whether or not the envelope of a bar code symbol is represented by the collected scan data.

When a bar code symbol envelope is detected, the bar code symbol presence detection module provides second control activation signal $A_2=1$ to the system controller. As will be described in greater detail hereinafter, second control activation signal $A_2=1$ causes the device to undergo a transition from the bar code presence detection state to bar code symbol reading state.

Similar to the object detection circuit described above, the bar code presence detection module is provided with two different modes of operation, namely, a long range mode of bar code presence detection and a short range mode of bar code presence detection. As shown in FIG. 4, these modes are set by the system controller using mode select enable signals $E_{IRT}=0$ and $E_{IRT}=1$, respectively. When induced into the long range mode of operation, the bar code presence detection module will generate second control activation signal $A_2=1$ whenever the envelope of a bar code symbol has been detected, despite the particular distance the bar code is from the transmission aperture. When induced into the short range mode of operation, the bar code presence detection module will generate second control activation signal $A_2=1$ when the envelope of a bar code symbol has been detected and only if the associated count (i.e. timing) data indicates that the detected bar code resides within the short range predetermined for bar code presence detection. Notably, similar to long range specification in connection with object detection, long range specification for bar code presence detection is preselected to be the entire operative scanning range available to the device. In an illustrated embodiment, this range can be from about 0 to about 10 inches from the transmission aperture, depending on the optics employed in the scanning means. This range is schematically indicated in FIGS. 3A and 3B. In the preferred embodiment, short range specification for bar code presence detection is preselected to be the same range selected for short range object detection (e.g. approximately 0 to about 3 inches from the transmission aperture), as indicated in FIGS. 3 and 3A. The inherently limited depth of field and width of field associated with the short range mode of bar code symbol detection prevents scanning means 11 and bar code symbol detection module 14 from actuating the reading of undesired bar code symbols in the scan field.

Unlike the bar code symbol presence detection module, the purpose and function of the bar code scan range detection module is not to detect the presence of a bar code symbol in the scan field, but rather to determine the range that a detected bar code symbol resides from the transmission aperture of the bar code symbol reading device. This data processing module operates upon digitized scan data signal $D_2$ collected from a bar code symbol which has been previously detected by the bar code symbol presence detection module.

In the preferred embodiment, bar code scan range detection module 15 analyzes digital count data produced by the bar code presence detection module, and determines at what range (i.e. distance) a detected bar code symbol resides from the transmission aperture. This determination then permits the scan range detection module to determine whether the detected bar code symbol is located within the prespecified long or short range of the scan field, as measured from the transmission aperture. As will be explained hereinafter in greater detail, this information is used by the bar code presence detection module (i.e., when induced into its short range mode of operation), to determine whether second control activation signal $A_2=1$ should be provided to the system controller. Upon the occurrence of this event, the bar code symbol reading device is caused to undergo a transition from the bar code symbol presence detection state to the bar code symbol reading state.

The function of symbol decoding module 16 is to process, scan line by scan line, the stream of digitized scan data $D_2$, in an attempt to decode a valid bar code symbol within a predetermined time period allowed by the system controller. When the symbol decoding module successfully decodes a bar code symbol within the predetermined time period, symbol character data $D_3$ (typically in ASCII code format) is produced corresponding to the decoded bar code symbol. Thereupon a third control activation signal $A_3$ is automatically produced by the symbol decoding module and is provided to the system controller in order to perform its system control functions.

As will be illustrated hereinafter with reference to FIGS. 8A–8C, the system controller generates and provides enable signals $E_{FC}$, $E_{DS}$ and $E_{DT}$ to data format conversion module 17, data storage unit 18 and serial data transceiver circuit 19, respectively, at particular stages of its control program. As illustrated, symbol decoding module 16 provides symbol character data $D_3$ to data format module 17 to convert data $D_3$ into two differently formatted types of symbol character data, namely $D_4$ and $D_5$. Format-converted symbol character data $D_4$ is of the "packed data" format, particularly adapted for efficient storage in data storage unit 18. Format-converted symbol character data $D_5$ is particularly adapted for data transmission to data collection and storage device 3, or a host device such as, a computer or electronic cash register. When symbol character data $D_4$ is to be converted into the format of the user's choice (based on a selected option mode), the system controller will generate and provide enable signal $E_{DS}$ to data storage unit 18, as shown in FIG. 4. Similarly, when format converted data $D_5$ is to be transmitted to a host device, the system controller will generate and provide enable signal $E_{DT}$ to data transmission circuit 19. Thereupon, data transmission circuit 19 transmits format-converted symbol character data $D_5$ to data collection device 3, via the data transmission lines of flexible connector cable 4.

In order to select either the long or short range mode of object (and/or bar code symbol presence) detection, bar code symbol reading device 2 is provided with both manual and automated mechanisms for effectuating such selections.

On the one hand, a manual switch (e.g., step button) 21 is mounted onto the top surface of the handle portion of the housing, so that long and short range modes of object detection can be simply selected by depressing this switch with ones thumb while handling the bar code reading device. The switch generates and provides mode activation signal $A_4$ to the system controller, which in turn generates the appropriate mode enable signal $E_{IRT}$.

In the illustrative embodiment, housing support stand detection means 20, realized as a magnetic field sensing circuit, is operably associated with the system controller to automatically generate mode activation signal $A_4$, when the hand-supportable housing is not, for example, being supported within a housing support stand (not shown) which bears a permanent magnetic disposed in proximity with its housing support surfaces. Preferably, a visual indicator light is provided to the housing to visually indicate the particular mode which has been manually or automatically selected.

In general, magnetic sensing circuit 20 comprises a magnetic flux detector 60, a preamplifier and a threshold detection circuit. Magnetic flux detector 60 produces as output an electrical signal representative of the intensity of detected magnetic flux density in its proximity. When housing 5 is placed in housing support stand embodying a permanent magnet(not shown), magnetic flux detector 60 will be in position to detect flux emanating from the permanent magnet. The produced electrical signal is amplified by the preamplifier whose output is compared to a predetermined threshold maintained in the threshold detector circuit. If the intensity of the detected magnetic flux exceeds the threshold, long-range mode activation signal $A_4=1$ is provided to the system controller.

As illustrated in FIG. 2, magnetic flux detector 60 is mounted to the rearward underside surface of the handle portion of the housing. In this illustrated embodiment, a ferrous bar 61 is interiorly mounted to the underside surface of the housing handle portion as shown. This arrangement facilitates releasable magnetic attachment of the hand-supportable housing to the magnetic bar fixedly installed in a housing support stand of the type described above. Preferably, a hole 62 is drilled through ferrous bar 61 to permit installation of magnetic flux detector 60 so that magnetic flux emanating from the magnetic bar in the support stand is detectable when the housing is positioned within the housing support stand. This arrangement is clearly illustrated in U.S. Pat. No. 5,340,971, supra. In this configuration, magnetic flux detector 60 is in proximity with the magnetic bar and long range mode activation signal $A_4=1$ is produced and provided to the system controller. In response, the system controller enables long range object detection (i.e., $E_{IRT}=0$) when the hand-supportable housing is removed from the housing support stand, the magnetic flux from the magnetic bar is no longer sufficient in strength to produce long range mode activation signal $A_4=1$; instead, short range mode activation signal $A_4=0$ is produced and provided to the system controller. In response, the system controller enables short range object detection (i.e., $E_{IRT}=1$).

It is understood that there are a variety of ways in which to configure the above described system components within the housing of the automatic bar code symbol reading device, while successfully carrying out of functions of the present invention. In FIGS. 2 and 2A, one preferred arrangement is illustrated.

In FIG. 2A, the optical arrangement of the system components is shown. Specifically, visible laser diode 47 is mounted in the rear corner of circuit board 64 installed within the head portion of the housing. A stationary concave mirror 53 is mounted centrally at the front end of circuit board 63, primarily for collecting laser light. Notably, the height of concave mirror 53 is such as not to block light transmission aperture 6. Mounted off center onto the surface of concave mirror 53 is very small second mirror 64 for directing the laser beam to planar mirror 49 which is connected to the motor shaft of a scanning motor 50, for joint oscillatory movement therewith. As shown, scanning motor 50 is mounted centrally at the rear end of circuit board 63. In the opposite rear corner of circuit board 63, photo-detector 54 is mounted.

In operation, laser diode 47 adjacent the rear of the head portion, produces and directs a laser beam in a forward direction to the small stationary mirror 64 and is reflected back to oscillating mirror 49. Oscillating mirror 49 scans the laser beam over the scan field. The returning light beam, reflected from the bar code, is directed back to oscillating mirror 49, which also acts as a collecting mirror. This oscillating mirror then directs the beam to stationary concave mirror 53 at the forward end of the housing head portion. The beam reflected from the concave mirror 53 is directed to photodetector 54 to produce an electrical signal representative of the intensity of the reflected light.

In front of stationary concave mirror 53, IR LED 28 and photodiode 31 are mounted to circuit board 63, in a slightly offset manner from longitudinal axis 9 of the head portion of the housing. Apertures 65 and 66 are formed in opaque portion 7B of the housing below the transmission aperture, to permit transmission and reception of IR type object sensing energy, as hereinbefore described. In order to shield IR radiation from impinging on photodiode 31 via the housing, a metallic optical tube 67 having an aperture 68 encases photodiode 31. By selecting the size of aperture, the placement of photodiode 31 within optical tube 67 and/or the radiation response characteristics of the photodiode, desired geometric characteristics for the object detection field can be achieved, as described hereinbefore. To prevent optical radiation slightly below 670 nanometers from entering the transmission aperture 6, a plastic filter lens 69 is installed over the transmission aperture for transmitting only optical radiation from slightly below 670 nanometers. Notably, in this way the combination of filter lens 69 at the transmission aperture and wavelength selective filter 150 before photoreceiver 54 cooperate to form a narrow band-pass optical filter having a center wavelength of about 670 nanometers. This arrangement provides improved signal-to-noise ratio for detected scan data signals $D.sub.1$.

The automatic bar code symbol reading device described above has numerous programmable system functions that can be selected (i.e., programmed) by simply entering its Function Programming Mode, and then reading specific function-encoded bar code symbols that correspond to particular system functions that one wants programmably implemented. The purpose of function parameter storage memory 19 is to store parametric data representative of particular functions that have been programmably selected while the device was in the Function Programming Mode. In function parameter storage memory 19, each function parameter is assigned a unique memory address 19A, and is grouped into a function class indicated in FIG. 7 by reference numeral 19B. In general, within each function class, one or more function parameters may be selected.

In the illustrative embodiment, the function parameter storage memory 19 stores function parameters for the following set of function classes: decode functions 19C; supplemental functions 19D; ITF symbol lengths 19E; minimum symbol length 19F; symbol length lock 19G; communication mode selection 19H; beeper operating characteristics 19I; scanner definition and test modes and same symbol time-out 19J; scanner functionality features 19K; UPC formatting options 19L; Non-UPC formatting options 19M; and long-range/short range selections 19N; etc. In general, one or more function parameters in storage memory 19 are set during the Function Programming Mode of the bar code symbol reader of the illustrative embodiment. For a bar code symbol reader having the function classes described above, the bar code symbol reader hereof may be programmed into any one of typically tens of thousands of different possible Function Configuration States. Among such possible Function Configuration States, there is one Default Function Configuration State, in which each function parameter within each function class is set to a prespecified (i.e., default) parameter value. In the Default Function Configuration State, the bar code symbol reader operates in a predetermined manner.

Any desired Function Configuration State, including the Default Function Configuration State, can be programmably selected by first causing the bar code symbol reader to first enter its Function Programming Mode. Notably, this programming mode is entered whenever a user desires to program (i.e., select) functions in the bar code symbol reader for either mastering or cloning a bar code symbol scanner/reader. In a scanner mastering environment, one or more function parameters in any single Function Class can then be individually set by reading one or more corresponding function-encoded bar code symbols off a preprinted Bar Code Symbol Programming Guide. Preferably, the preprinted Bar Code Symbol Programming Guide is of the general type distributed by Meteorologic Instruments, Inc. with each one of its programmable bar code symbol scanners and readers.

Figure 8:
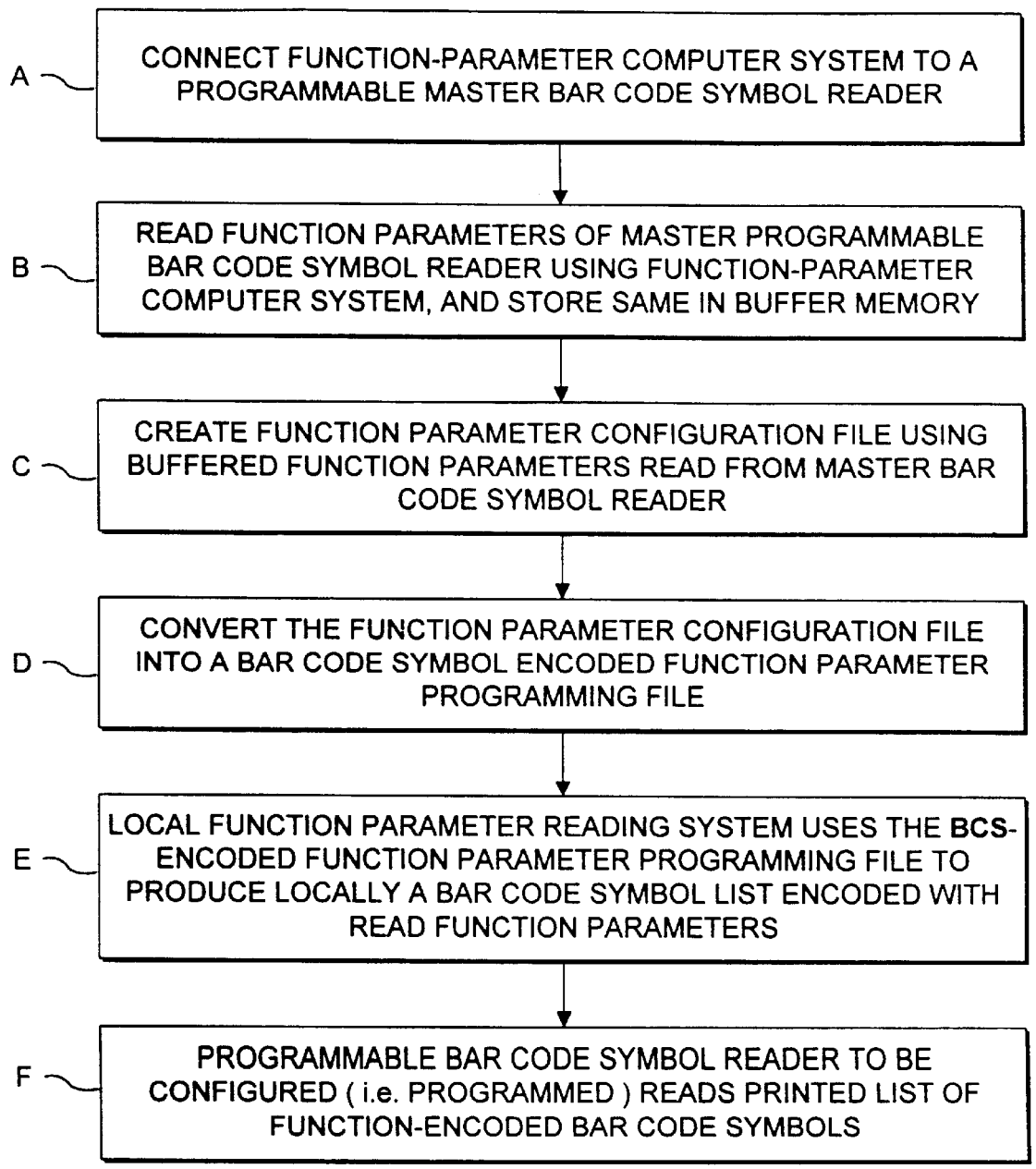
FIG. 8 is a block process diagram illustrating the major steps undertaken when carrying out the method of programming (i.e., configuring) a master set of system function parameters in a programmable bar code symbol reader according to a first illustrative embodiment of the present invention.
Figure 11:
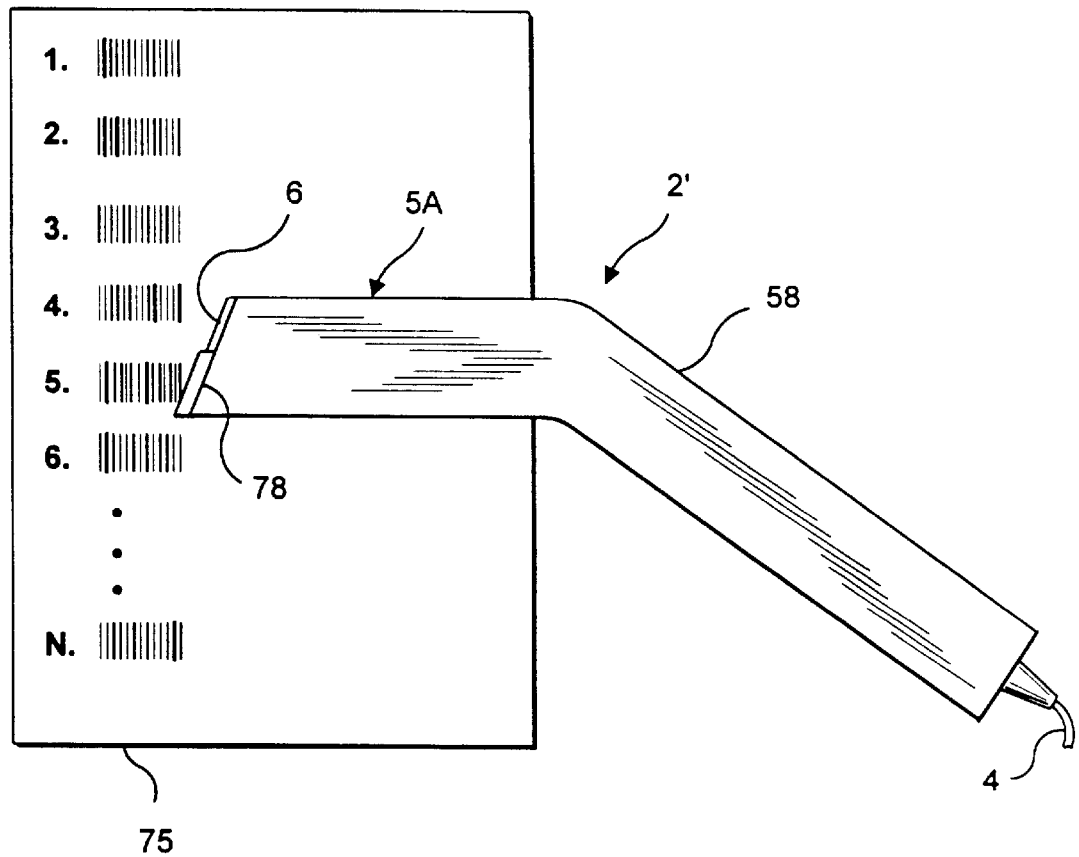
FIG. 11 is a schematic representation showing a programmable bar code symbol reader reading (i.e., scanning and decoding) the master list of function-encoded bar code symbols shown in FIG. 14.
Figure 12:
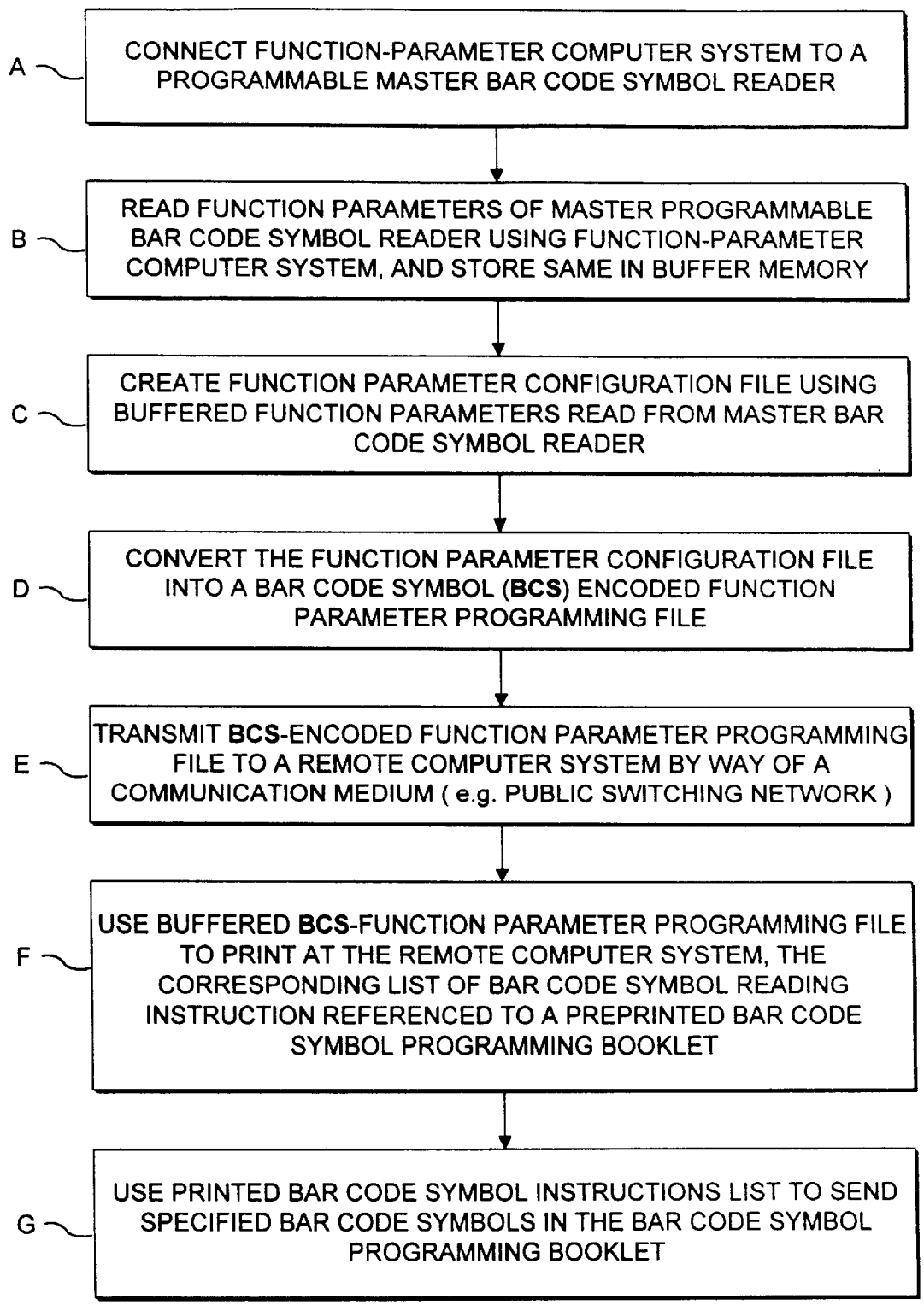
FIG. 12 is a block process diagram illustrating the major steps undertaken when carrying out the method of programming a master set of system function parameters in a programmable bar code symbol reader according to a second illustrative embodiment of the present invention.
Figure 14:
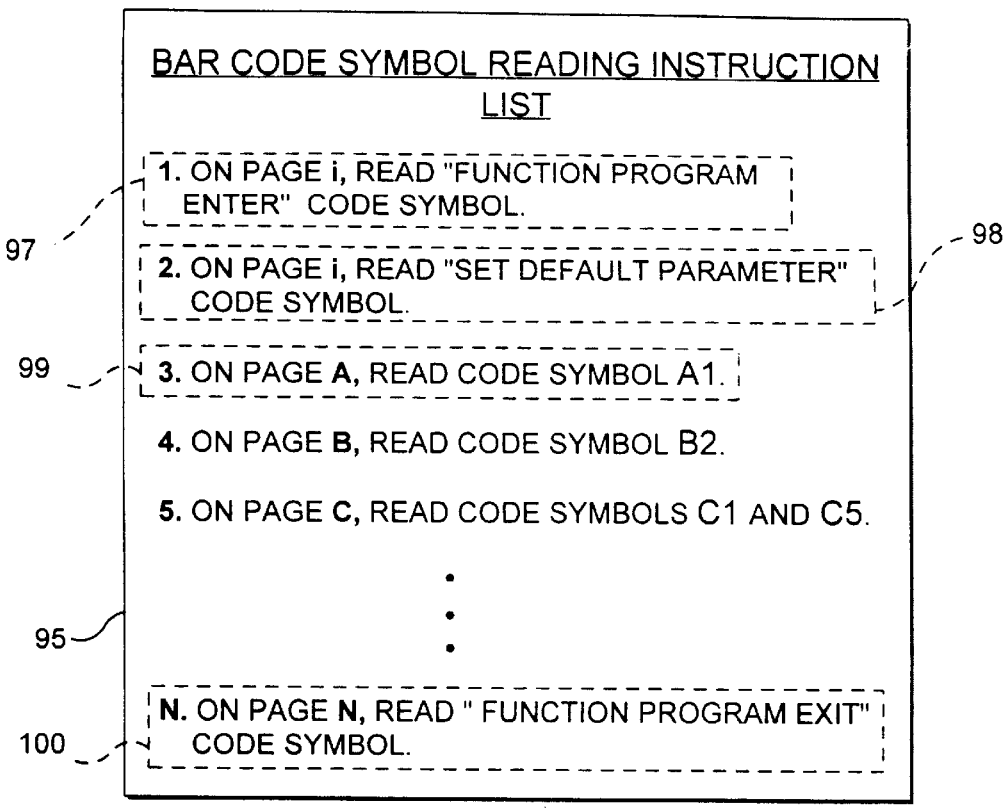
FIG. 14 is a schematic representation of a master list of bar code symbol reading instructions referencing specific function-encoded bar code symbols preprinted in the bar code symbol programming booklet of FIG. 15, and when read in sequential order, automatically programs a bar code symbol reader with a particular master set of function parameters set in a master bar code symbol reader from which other bar code symbol scanners are to be configured.
Figure 15:
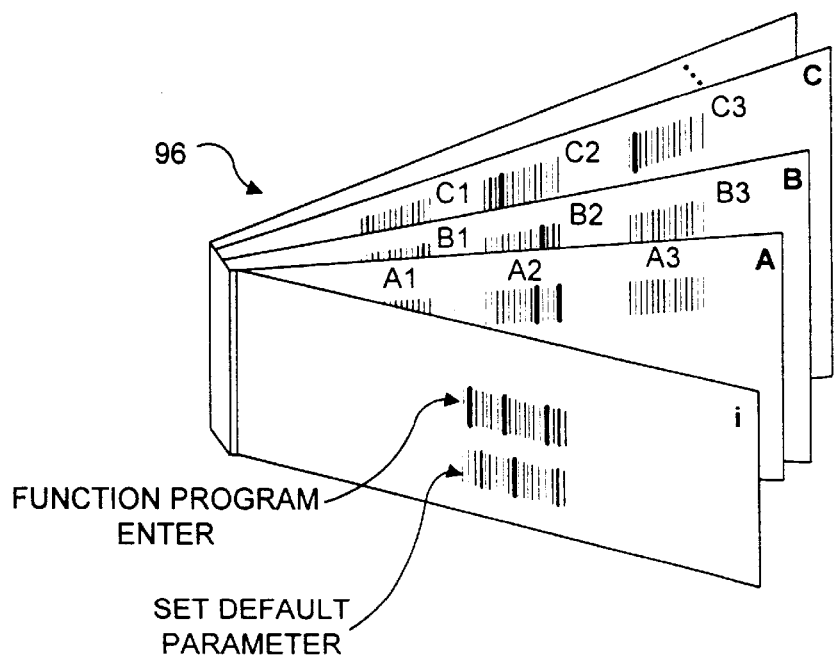
FIG. 15 is a schematic representation of a preprinted bar code symbol programming guide constructed in accordance with the principles of the present invention.

Once a master bar code symbol reader has been configured, one or more cloned versions of the master bar code symbol reader can be produced using the function parameter programming method of the present invention. In general, there will be various ways to carry out the method of the present invention. Two embodiments of this method are schematically illustrated herein. The first method is illustrated in FIG. 8 and involves the use of the apparatus shown in FIGS. 9, 11 and 11A. The second method is illustrated in FIG. 12 and involves the use of the apparatus shown in FIGS. 13, 14 and 15. Each of these illustrative embodiments of the method hereof will be described below.

As indicated at Block A of FIG. 8, the first step in the method of FIG. 8 involves connecting a local function-parameter reading (i.e., acquisition) computer system 70 to "master" bar code symbol reader. In the illustrative embodiments, function parameter reading computer system 70 is realized as a laptop computer system running either MS-DOS, Microsoft Windows, X-Windows, or Macintosh System 7.5 Operating System software. Preferably, the computer system has a high-resolution local printer 71 and printer drivers for printing bar code symbols in a manner well known in the art. In addition, the function-parameter reading computer system 70 has stored on its hard-drive memory, a Function Parameter Configuration Program which is particularly designed to cooperate with the Main System Control Routine of each master bar code symbol reader. The functions of the Function Configuration Program will be described in great detail hereinafter with reference to FIGS. 8 and 12.

Preferably, the master bar code symbol reader 2 is connected to the function-parameter reading computer system 70 by connecting the serial data communication port of the master bar code symbol reader to the serial data communication port of the function-parameter reading computer system 70. Typically, a conventional serial data communication cable 73 is used to achieve such a connection. As indicated at Block B in FIG. 8, once these data communication ports are in serial communication with each other, the function parameter reading computer system 70 reads the function parameters from the function parameter storage memory 19 of the master bar code symbol reader 2, and buffers these parameters within its memory.

At Block B in FIG. 8, the function-parameter reading computer system 70, running the Function Parameter Configuration Program, uses the buffered function parameters to create an (ASCII-based) Function Parameter Configuration File.

As indicated at Block C in FIG. 8, the function parameter reading computer system 70 then uses the buffered function parameters to create an (ASCII-based) Function Parameter Programming File and the activation code for default parameter set mode. In essence, Function Parameter Programming File comprises a list of ASCII codes whose first list entry is representative of Function Programming Mode Activation, and whose last list entry is representative of Function Programming Mode Deactivation. The second list entry is an ASCII code which represents the setting of all function parameters to the predetermined Default Parameter Settings. The third to the second-to-last list entries are ASCII codes representative of function parameters of the master bar code symbol reader, arranged in a predetermined order between the first and last list entries of this list-type file structure.

As indicated at Block D in FIG. 8, the function parameter reading computer system 70 then locally converts the Function Parameter Programming File Structure into a Bar Code Symbol (BCS) Encoded Function Parameter Programming File Structure. The BCS-Encoded Function Parameter Programming File represents a list of Function-Encoded Bar Code Symbols which, when read in sequence by a clone bar code symbol reader 2', automatically programs the function parameters in clone bar code symbol reader 2' to that of the master bar code symbol reader 2. In essence, during the file conversion process at Block D of FIG. 8, each ASCII code in the Function Parameter Programming File is assigned a unique bar code symbol (e.g., typically representative of a unique number) and the digital code associated with the assigned bar code symbol is placed in the BCS-Encoded Function Parameter Programming File. This way, when the BCS-Encoded Function Parameter Programming File is provided to local printer 71, its processor can decode such digital codes and properly print the bar code symbol assigned to each list entry in the Function Parameter Programming File.

As indicated at Block E in FIG. 8, the local function parameter reading computer system 70 uses the BCS-Encoded Function Parameter Programming File to produce a bar code symbol list 75. As shown in FIG. 11, bar code symbol list 75 is particularly encoded to programmably configure a compatible bar code symbol reader 2 with the same function parameters set in master bar code symbol reader 2. Then, at Block F, a compatible (i.e., like) bar code symbol reader 2' is configured into the master bar code symbol reader 2, by reading, in sequential order, the list of bar code symbols 75 custom-printed by the local printer 71.

As shown in FIG. 11A, each bar code symbol printed in the third through the second-to-last position in the list 75 has three fields, namely: Memory Address Field 76; Function Parameter Value Field 77; and Set/Clear Field 78. The Memory Address Field 77 indicates the address location in function parameters storage 19 where the function parameter data is stored. The Function Parameter Valve Field 78 identifies the value of the function parameter to be set. The Set/Clear Field 79 indicates the particular operation that is to be performed on the parameter stored in the addressed memory storage location. The binary bits in each of these fields are decoded by system controller 22 shown in FIG. 4.

When the first bar code symbol 80 in the printed list 75 is read by clone bar code symbol reader 2' as shown in FIG. 11, it automatically causes (i.e., induces) bar code symbol reader 2' being configured to enter its Function-Programming Mode of Operation. When the second bar code symbol (i.e., the "Recall Default Function Parameters" bar code symbol) 81 in the printed list is read, it automatically causes all the function parameters to be set to their Default values, thus providing a memory reference. This memory reference is used when particular function parameters are changed during whenever the third bar code symbol 82 through the second-from-last bar code symbol 83 are read from the printed list 75. Then when the third bar code symbol 82 is read, its corresponding function parameter is set to the value indicated in its Function Parameter Value Field, as indicated in FIG. 11A. When last bar code symbol 84 is read off the printed list, the bar code symbol reader 2' being configured, automatically exits its Function Programming Mode, and returns to the object detection state of its Symbol Reading Mode. When all of the steps in FIG. 8 are completed, the bar code symbol reader 2', which has read the printed list of bar code symbols 75 in sequential order, will be automatically programmed with the identical configuration of function parameters set in the master bar code symbol reader 2'. As such, the clone bar code symbol scanner 2' will have the same configuration of functionalities as the master bar code symbol reader 2.

Figure 9:
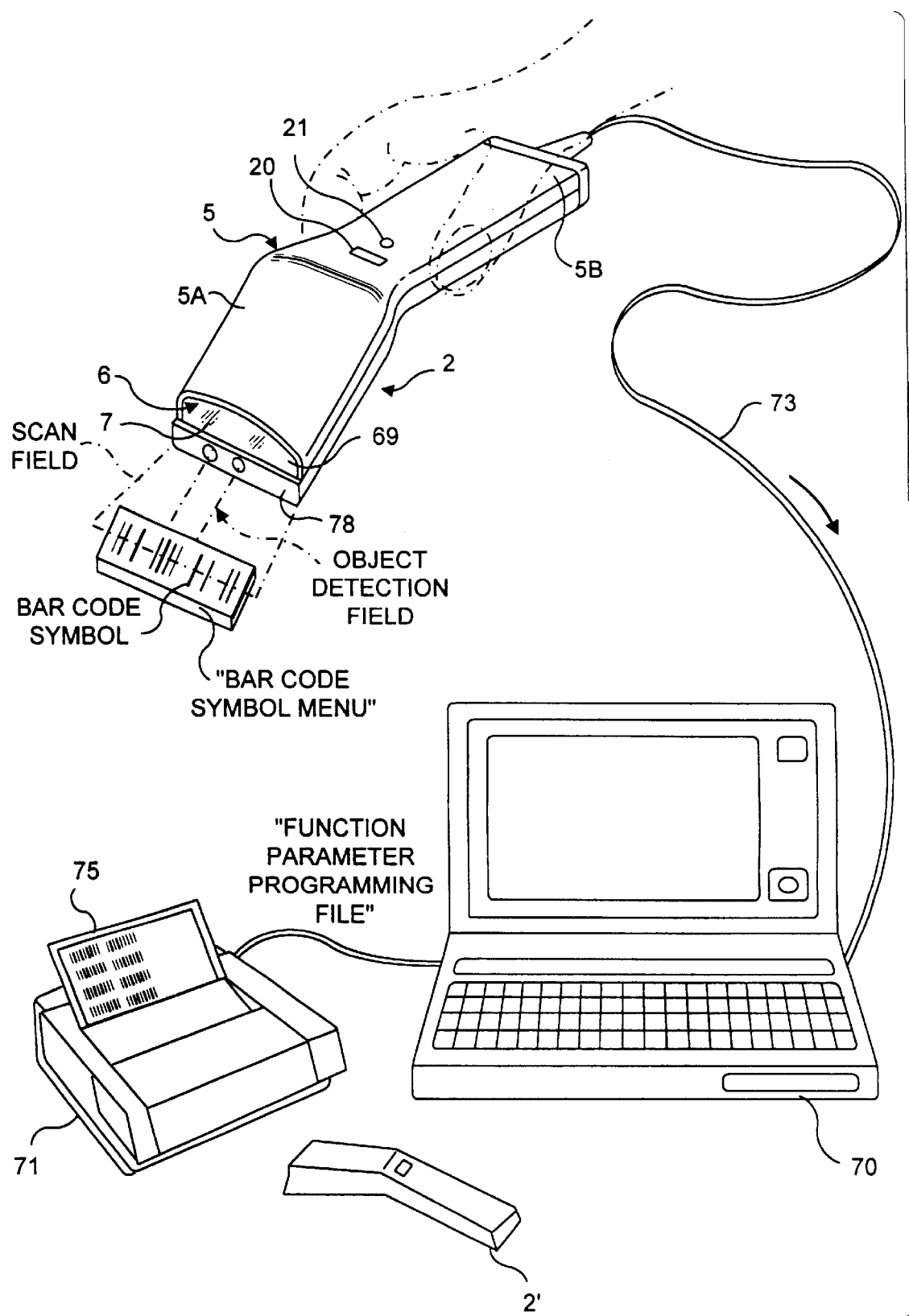
FIG. 9 is a perspective view of the programmable bar code symbol reader of FIG. 1 operably connected to the function parameter acquisition system of the present invention, showing the function parameter reading system reading (i.e., acquiring) the "master" set of function parameters stored in the programmable bar code symbol reader and converting such function parameters directly into a printable list of function-encoded bar code symbols uniquely corresponding thereto, which when read in sequential order by another programmable bar code symbol reader, automatically programs the programmable bar code symbol reader with the master set of function parameters.
Figure 13:
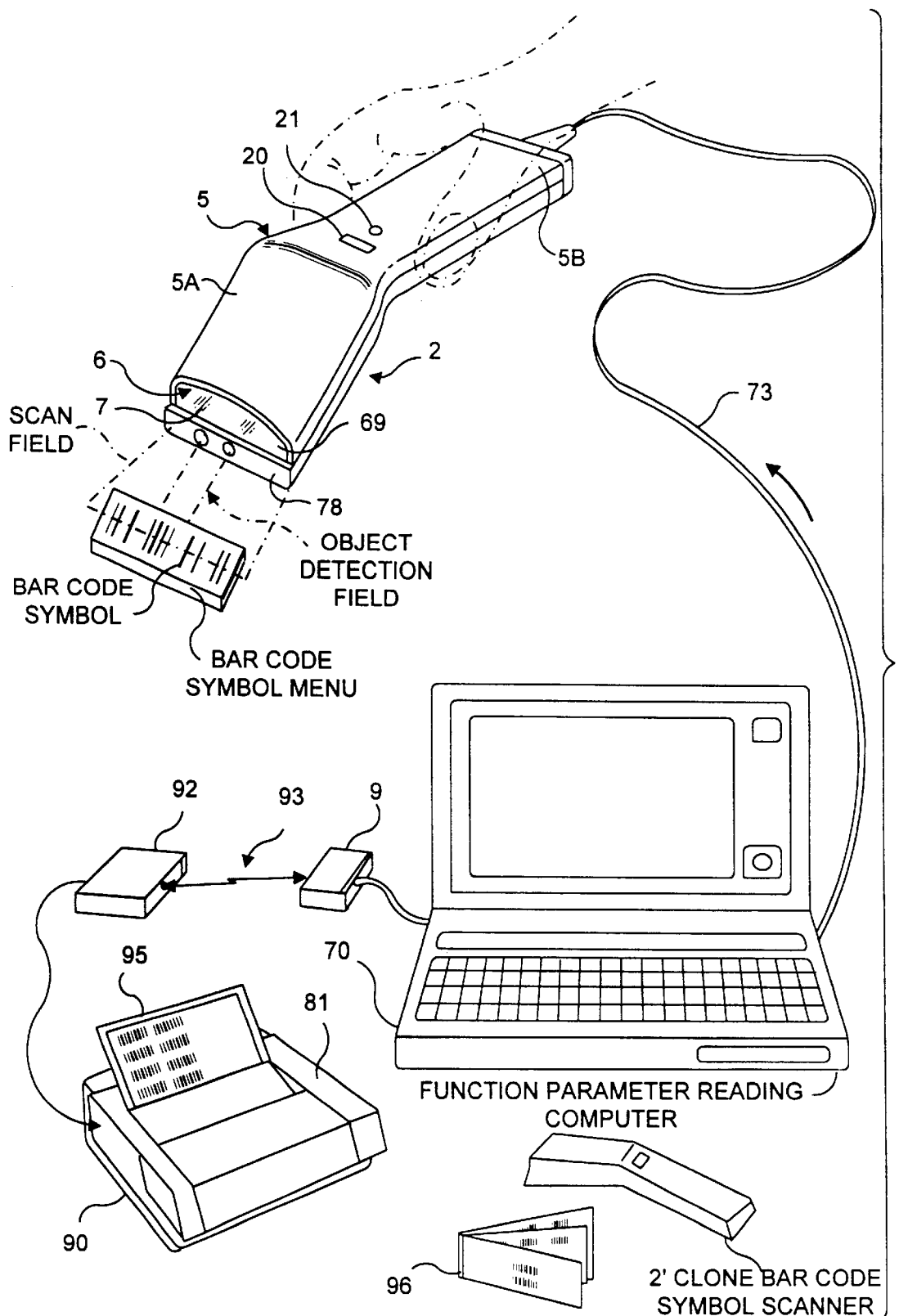
FIG. 13 is a perspective view of a programmable bar code symbol reader of FIG. 1 operably connected to the function parameter reading system of the present invention, showing the function reading computer system reading (i.e., acquiring) the master set of function parameters stored in the programmable bar code symbol reader and converting such function parameters into a function-parameter programming file transmittable to a remotely situated computer system for printing out a master list of function-encoded bar code symbols uniquely corresponding thereto, and when read in sequential order by another programmable bar code symbol reader, automatically programs the bar code symbol reader with the master set of function parameters.

In FIG. 12, the method of the second illustrative embodiment present invention is shown carried out using the function reading computer system 70 of FIG. 9, with several modifications. As shown in FIG. 13, a printer 89, remotely located from "local" function parameter reading computer system 70, is operably associated with a remote computer system 90. Local and remote computer systems 70 and 90 are in data communication with each other by way of a pair of modems 91 and 92, which may be either external or internal to its respective computer system. Each of these modems in turn are connected to a data combination network 93 of one sort of another. The data communication network can be a public switching telecommunications network, local area network (LAN), wide area network (WAN), or any other communication medium over which serial or parallel data communication can be performed.

As shown, Blocks A through D of FIG. 12 are identical to Block A through D of FIG. 8. However, at Block E in FIG. 12, the BCS-Encoded Function Parameter Programming File is transmitted from local function parameter reading computer system 70 to the remote computer system 90 by way of modems 91 and 92 and communication network 93. At remote the computer system 90, the received BCS-Encoded Function Parameter Programming File is stored in memory within computer system 90.

At Block F, the remote computer system 90 uses the stored BCS-Encoded Function Parameter Programming File to print a list of Bar Code Symbol Reading Instructions 95 which contains a list of codes for printing a specific list of Bar Code Symbol Reading Instructions. Each Bar Code Symbol Reading Instruction in this custom list specifies a specific function-encoded bar code symbol, referenced and preprinted in a Bar Code Symbol Programming Booklet 96 of the type shown in FIG. 15, which is read in a particular order during function parameter configuration process. Notably, each Bar Code Symbol Reading Instruction 97 has a Page Reference and Function-Encoded Symbol reference. The Page Reference makes a reference to a particular page in the Bar Code Symbol Programming Booklet 96, whereas Function-encoded Symbol reference refers to a function-encoded bar code symbol printed on the referenced page in the BCS-Programming Booklet. For convenience sake, each page also includes printed bar code symbols 80 and 84 for entering and exiting the Function Parameter Programming Mode, respectively, of the programming bar code symbol reader 2' being configured.

At Block G, the Bar Code Symbol Reading Instruction List 95 is read in the specified order, so as to automatically configure the function parameters of the bar code symbol reader 2' to have identically the same system function configuration as the master bar code symbol reader 2. This last step, at Block G, is carried out as follows. First, the user must first the read bar code symbol specified by the first bar code symbol reading instruction 97, which causes the symbol reading device to enter its Function Parameter Programming Mode of operation. Secondly, the user must then the read bar code symbol specified by the second bar code symbol reading instruction 98, which causes all of the function parameters in the symbol reading device to be set to their Default values. Thereafter, the third instruction 99, forth and subsequent instructions are followed in order to automatically program the function parameters specified thereby. Reading the bar code symbol in the Programming Booklet, specified by each Bar Code Symbol Reading Instruction in the printed list 95, automatically programs one function parameter in the bar code symbol being used to carry out the instructions. When all of the instructions relating to function-encoded bar code symbols have been executed by the user (e.g., operator), then the last bar code symbol, referenced by instruction 100, is read in order to cause the bar code symbol reader to exit the Function Programming Mode and return to its normal Symbol Reading Mode.

Figure 10:
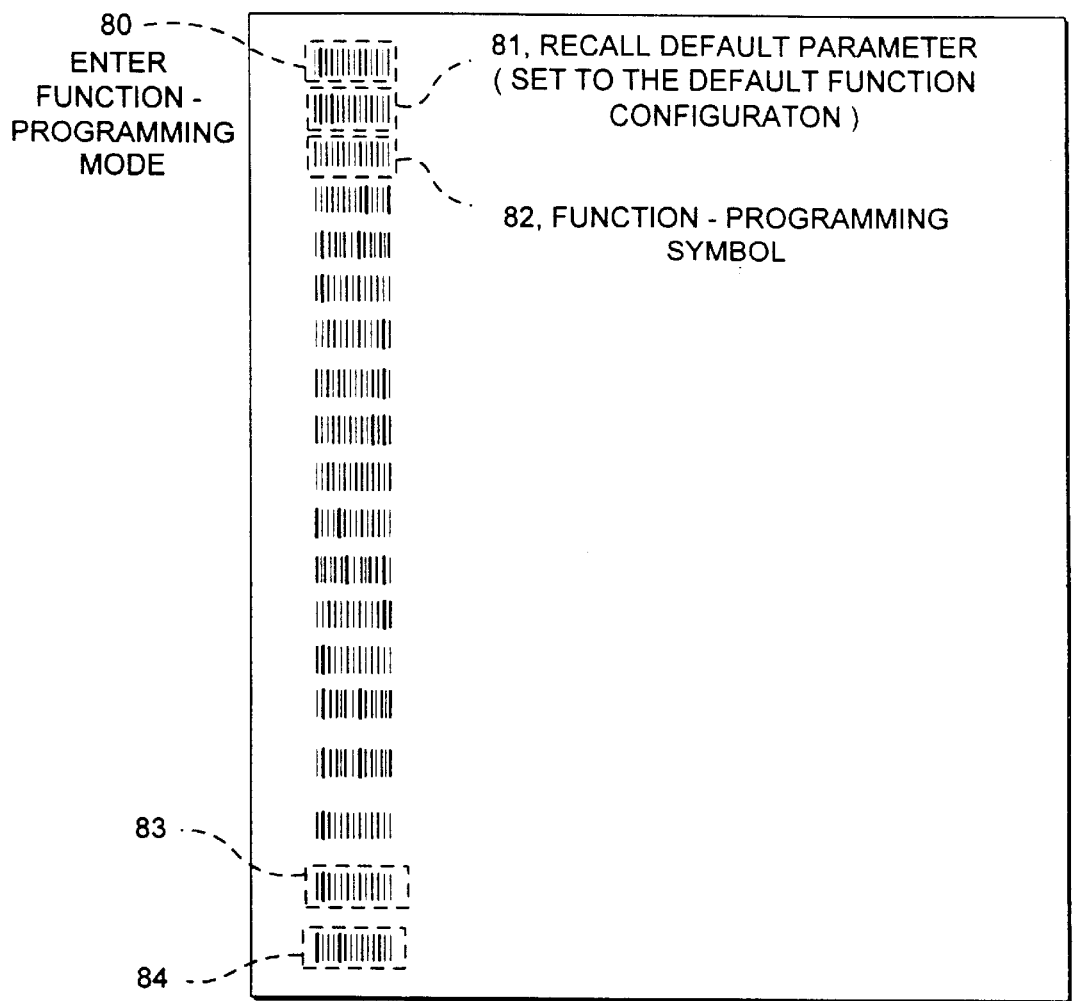
FIG. 10 is a schematic representation of an exemplary list of function-encoded bar code symbols printed in sequential order in accordance with the principles of the present invention.
Figure 10A:
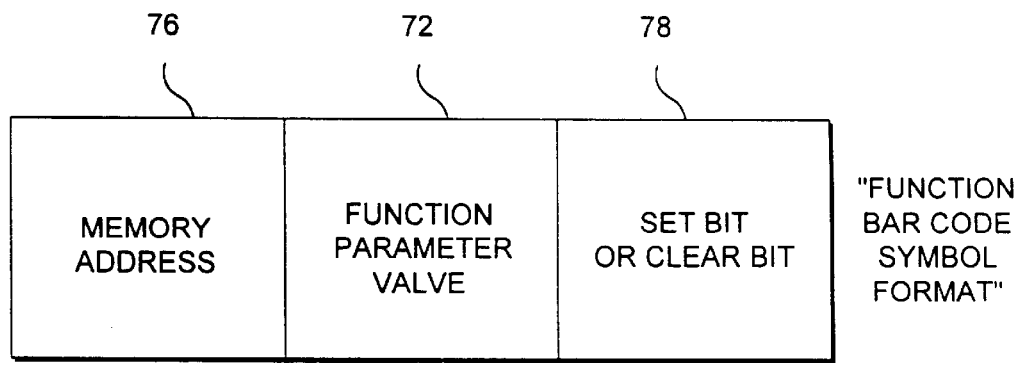
FIG. 10A is a schematic representation of the format of each function-encoded bar code symbol printed in the exemplary master list of FIG. 10.

Having described the detailed structure and internal functions of automatic bar code symbol reading device of the present invention, the operation of the system controller thereof will now be described while referring to Blocks A to CC in FIGS. 8A–8C, and the system block diagram shown in FIG. 4. Notably, however, the control process illustrated in FIGS. 16A–16C is carried out in both the "master" and "clone" bar code symbol reading devices 2 and 2' illustrated in FIGS. 10 and 13, in particular. Consequently, throughout the following description of the control process of FIGS. 16A–16C, reference will be made to either the "master" bar code symbol reader 2 or the "clone" bar code symbol reader 2[000c], as the control blocks of the process implicate.

Beginning at the START block of the Main System Control Routine and proceeding to Block A, the bar code symbol reading device is initialized. This involves continuously activating (i.e., enabling) IR sensing circuit 10A and the system controller. The system controller, on the other hand, deactivates (i.e., disables) the remainder of activatable system components, e.g., laser diode 47, scanning motor 50, photoreceiving circuit 12, A/D conversion circuit 13, bar code presence detection module 14, bar code scan data range detection module 15, symbol decoding module 16, data format conversion module 17, data storage unit 18, and data transmission circuit 19. All timers $T_1$, $T_2$, $T_3$, $T_4$ and $T_5$ (not shown) maintained by the system controller are reset to t=0.

Proceeding to Block B in FIG. 16A, the system controller checks to determine whether control activation signal $A_1=1$ is received from IR sensing circuit 10A. If this signal is not received, then the system controller returns to the Block A in FIG. 16A. If signal $A_1=1$ is received, indicative that an object has been detected within the object detection field, then the system controller proceeds to Block C, at which timer $T_1$ is started and is permitted to run for a preset time period, e.g., $0 \leq T_1$, $\leq 3$ seconds, and timer $T_2$ is started and permitted to run for a preset time period $0 \leq T_2 \leq 5$ seconds.

Proceeding to Block D in FIG. 16A, the system controller activates laser diode 47, scanning motor 50, photoreceiving circuit 12, A/D conversion circuit 13 and bar code presence detection module 14 in order to collect and analyze scan data signals for the purpose of determining whether or not a bar code is within the scan field. Then, at Block E, the system controller checks to determine whether control activation signal $A_2=1$ is received from bar code presence detection module 14 within time period $1 \leq T_1 \leq 3$ seconds. If activation control signal $A_2=1$, is not received within this period, indicative that a bar code is not within the scan field, then the system controller proceeds to Block F. At Block F, the system controller deactivates laser diode 47, scanning motor 50, photoreceiving circuit 12, A/D conversion circuit 13 and bar code presence detection module 14. Then the system controller remains at Block G until it receives control activation signal $A_1=0$ from IR sensing circuit 10A, indicative that the object is no longer in the object detection field. When this condition exists, the system controller returns to the Block A.

If, however, the system controller receives control activation signal $A_2=1$ within time period $0 \leq T_1 \leq 3$ seconds, indicative that a bar code has been detected, then the system controller proceeds to Block H. As will be described hereinafter, this represents a state from the bar code presence detection state to the bar code symbol reading state. Proceeding to block H, the system controller continues activation of laser diode 47, scanning motor 50, photoreceiving circuit 12, and A/D conversion circuit 13, and commences activation of symbol decoding module 14. At this stage, fresh bar code scan data is collected and is subject to decode processing. At essentially the same time, at Block I, the system controller starts timer $T_3$ to run for a time period $0 \leq T_3 \leq 1$ second.

As indicated at Block J in FIG. 16A, the system controller checks to determine whether control activation signal $A_3=1$ is received from the symbol decoding module 16 within $T_3=1$ second, indicative that a bar code symbol has been successfully read (i.e., scanned and decoded) within the allotted time period. If control activation signal $A_3$ is not received within the time period $T_3=1$ second, then at Block K the system controller checks to determine whether control activating signal $A_2=1$ is received within time period $0 \leq T_3 \leq 3$ seconds. If a bar code symbol is not detected within this time period, then the system controller proceeds to Block L to deactivate laser diode 47, scanning motor 50, photoreceiving circuit 12, A/D conversion circuit 13, bar code presence detection module 14 and symbol decoding module 16. Notably, this event causes a transition from the bar code reading state to the object detection state. Thereafter, at Block M the system controller remains in the object detection state awaiting control activation signal $A_1=0$, indicative that an object is no longer present in the object detection field. When this condition exists, the system controller returns to Block A, as shown.

If at Block K, however, the system controller receives control activation signal $A_2=1$, indicative that a bar code once again is within the scan field then the system controller checks to determine whether time period $T_2$ has elapsed. If it has, then the system controller proceeds to Block L and then to Block A by way of Block M. If, however, time period $0 \leq T_2 \leq 5$ seconds has not elapsed, then the system controller resets timer $T_3$ to run once again for a time period $0 \leq T_3 \leq 1$ second. In essence, this provides the device at least another opportunity to read a bar code symbol present within the scan field when the system controller is at control Block J.

Upon receiving control activation signal $A_3=1$ from symbol decoding module 16, indicative that a bar code symbol has been successfully read, the system controller proceeds to Block 0 in FIG. 16B. At Block 0, the system controller determines whether the read bar code symbol is preassigned (i.e., pre-encoded) to activate the Function Parameter Reading Mode of the bar code symbol reading device. Typically, such a bar code symbol will be read by the "master" bar code symbol reader 2 as illustrated in FIGS. 9 and 13. If such a bar code symbol is read by "master" bar code symbol reader 2, then at Block P the system controller determines whether the serial data communication port of the bar code symbol reading device (i.e., serving as a "master" symbol reader) is operably connected to the serial data communication port of the function-parameter reading computer system 70. In the illustrative embodiment, this connection is achieved by way of data communication cable 73. If such connection or communication link is not established at this stage of the process, then at Block P the system controller returns to Block A in FIG. 16A, as shown. If, however, these devices are operably linked for data communication, then at Block Q the system controller in master bar code symbol reading device 2 enters its Function Parameter Reading Mode. At Block R, the system controller reads the function parameters set in its function parameter memory 19, and then transmits the read function parameters to the function-parameter reading computer system 70 operably connected to the data communication port of the master bar code symbol reader 2. The system controller remains at Block S until all read function parameters have been successfully transmitted to function parameter reading computer system 70. The received set of function parameters are then stored in the buffer memory within computer system 70, and subsequently processed and utilized as described above in connection with FIGS. 8 and 12, above. Thereafter, at Block T the system controller in master bar code symbol reader 2 automatically exits its Function Parameter Reading Mode, returning to its normal Bar Code Symbol Reading Mode at Block A in 16A, as shown.

If at Block 0 in FIG. 16B, the system controller determines that the read bar code symbol is not the activation code for the Function Parameter Reading Mode, then at Block U the system controller determines whether the read bar code symbol is the activation code symbol for the Function Parameter Programming Mode. If it is the activation code symbol for the Function Parameter Programming Mode, then at Block V the system controller enters the Function Parameter Programming Mode of the master bar code symbol reading device 2 and therefor automatically returns to Block A so that function-encoded read code symbols can be subsequently read during the "mastering" (i.e., function configuring process).

However, if at Block U in FIG. 16B the read bar code symbol is not the activation code symbol for the Function Parameter Programming Mode, then at Block W the system controller determines whether the read bar code symbol is the deactivation code symbol for deactivating the Function Parameter Programming Mode. If it is such a mode deactivation code symbol, then at Block X the system controller exits the Function Parameter Programming Mode and returns to Block A in FIG. 16A, as shown. If at Block W the read bar code symbol is not the deactivation code symbol for the Function Parameter Programming Mode, then at Block Y the system controller determines whether the Function Parameter Programming Mode is presently activated. If the Function Parameter Programming Mode is activated, then at Block Z, the system controller determines whether the read (i.e., scanned and decoded) bar code symbol is a function-encoded bar code symbol, such as the type 82–83 printed on list 75 shown in FIG. 11. If the read bar code symbol is a function-encoded bar code symbol, then at Block AA in FIG. 16B, the system controller (e.g., in the clone bar code symbol reader 2') decodes the bits in the fields of the function-encoded bar code symbol, sets the identified function parameter to the specified function parameter valve, and then returns to Block A in FIG. 16A, as shown. If, however, at Block Z, the system controller determines that the decode bar code symbol is not a function-encoded bar code symbol, then the system controller returns to the Block A in FIG. 16A, as shown.

If at Block Y, the system controller determines that the Function Programming Mode is not presently active, then the system controller proceeds to Block BB in FIG. 16C.

At Block BB in FIG. 16C, the system controller continues to activate laser diode 47, scanning motor 50, photoreceiving circuit 12 and A/D conversion circuit 13, while deactivating symbol decoding module 16 and commencing activation of data format conversion module 17, data storage unit 18 and data transmission circuit 19. These operations maintain the scanning of the laser beam across the scan field, while symbol character data is appropriately formatted and transmitted to data collection device 3, or a host device, by a conventional data communication process well known in the art.

After transmission of symbol character data to the host device is completed, the system controller enters Block CC and continues activation of laser diode 47, scanning motor 50, photoreceiving circuit 12 and AID conversion circuit 13, while deactivating symbol decoding module 16, data format-conversion module 18, data storage unit 18 and data transmission circuit 19. To detect the continued presence of an object within the object detection field, the system controller checks at Block DD whether control activation signal A.sub.1 32 1 is received from IR sensing circuit 10A. If A.sub.1=0, indicative that the object is no longer in the object detection field, then the system controller returns to the Block A. If control activation signal A.sub.1=1 is received, then at Block EE the system controller activates bar code presence detection module 14. These events represent once again a state transition from object detection to bar code symbol presence detection.

At Block FF in FIG. 16C, the system controller starts timer T.sub.4 to run for a time period 0.ltoreq.T.sub.4 .ltoreq.5 seconds, and timer T.sub.5 to run for a time period 0.ltoreq.T.sub.5 .ltoreq.3 seconds. Then to determine whether a bar code symbol has been detected within the scan field, system controller proceeds to block GG to check whether control activation signal A.sub.2=1 is received. If this signal is not received with the time period 0.ltoreq.T-.sub.5 .ltoreq.5 seconds, indicative that no bar code symbol is present in the scan field, the system controller proceeds to Block HH, at which it deactivates laser diode 47, scanning motor 50, photoreceiving circuit 12, A/D conversion circuit 13 and bar code presence detection module 14. Thereafter, the system controller remains at Block II until the object leaves the object detection field and (i.e., receives control activation signal A.sub.1=0), at which time the system controller returns to the Block A, as shown.

If, however, at Block T in FIG. 16C, control activation signal A.sub.2=1 is received, indicative that a bar code symbol has been detected in the scan field, the system controller proceeds through Blocks JJ and KK to reactivate the symbol decoding module and start timer T.sub.6 to run for a time period 0.ltoreq.T.sub.6 .ltoreq.1 second. These events represent a state transition from bar code symbol presence detection to bar code symbol reading. At Block LL, the system controller checks to determine whether control activation signal A.sub.3=1 is received from signal decoding module 16 within time period 0.ltoreq.T.sub.6 .ltoreq. 1 second. If a bar code symbol is not successfully read within this 1 second time period, the system controller returns to Block GG to form a first loop, within which the device is permitted to detect or redetect a bar code symbol within the time period 0.ltoreq.T.sub.4 .ltoreq.5 seconds. If a bar code symbol is decoded within this time interval, the system controller determines at Block MM whether the decoded bar code symbol is different from the previously decoded bar code symbol. If it is different, then the system controller returns to Block BB as illustrated, to format and transmit symbol character data as described hereinabove.

If, however, the decoded bar code symbol is not different than the previously decoded bar code symbol, then at Block NN in FIG. 16C the system controller checks to determine whether timer T.sub.4 has lapsed. If it has not lapsed, the system controller returns to Block GG to form a second loop, within which the device is permitted to detect or redetect a bar code symbol in the scan field and then successfully read a valid bar code symbol within the set time interval 0.ltoreq.T.sub.4 .ltoreq.5 seconds. If, however, timer T.sub.4 lapses, then the system controller proceeds to Block OO at which the system controller deactivates laser diode 47, scanning motor 50, photoreceiving circuit 12, A/D conversion circuit 13, bar code presence detection module 14, and symbol decoding module 16. Thereafter, the system controller remains at Block PP until control activation signal A.sub.1=0 is received from IR sensing circuit 10A, indicative that the object detection field is free of any objects. At this stage, the system controller returns to the Block A, as shown in FIG. 8C.

The operation of automatic bar code symbol reading device of the present invention has been described in connection with Main System Control Routine which uses control activation signals $A_1$, $A_2$ and $A_3$. This system control routine operates on two basic assumptions concerning IR sensing circuit 10A and bar code symbol presence detection module 14. Specifically, the System Control Routine assumes that the IR sensing circuit produces control activation signal $A_1=1$ whenever an object is detected anywhere within the operative detection range of the object detection field. It also assumes that the bar code symbol presence detection module produces control activation signal $A_2=1$ whenever a bar code symbol is detected anywhere within the operative scanning range of the scan field. These assumptions cause state transitions in the operation of the automatic bar code symbol reading device, when otherwise they may not be desired in particular applications.

For example, in some applications it may not be desirable to automatically advance the symbol reading device to its bar code presence detection state until an object bearing a bar code is brought within the short range of the object detection field, as hereinbefore described. Also, it may not be desirable to automatically advance bar code symbol reading state until a detected bar code symbol is brought within the short range of the scanning field as hereinbefore described. In some instances, it may be desirable to condition transitions from (i) the object detection state to the bar code symbol presence detection state as well as (ii) the bar code symbol presence detection state to the bar code symbol reading state. Yet, in other instances, it may only be desirable to condition one of these state transitions. The bar code symbol reading device of the present invention is capable of conditioning each of these states on whether the detected bar code symbol is present in either the long or short range portion of the scan field of the device. Additional details regarding the operation of the long and short range modes of the bar code symbol reading device hereof can be found in U.S. Pat. No. 5,340,971.

Having described the operation of the illustrative embodiment of the bar code symbol reading device hereof, it will be helpful at this juncture to describe the various conditions which will cause state transitions to occur during the automatic operation of the device while in the normal bar code symbol reading mode. In this regard, reference is made to FIG. 13 which provides a state transition diagram for the illustrative embodiment.

Figure 17:
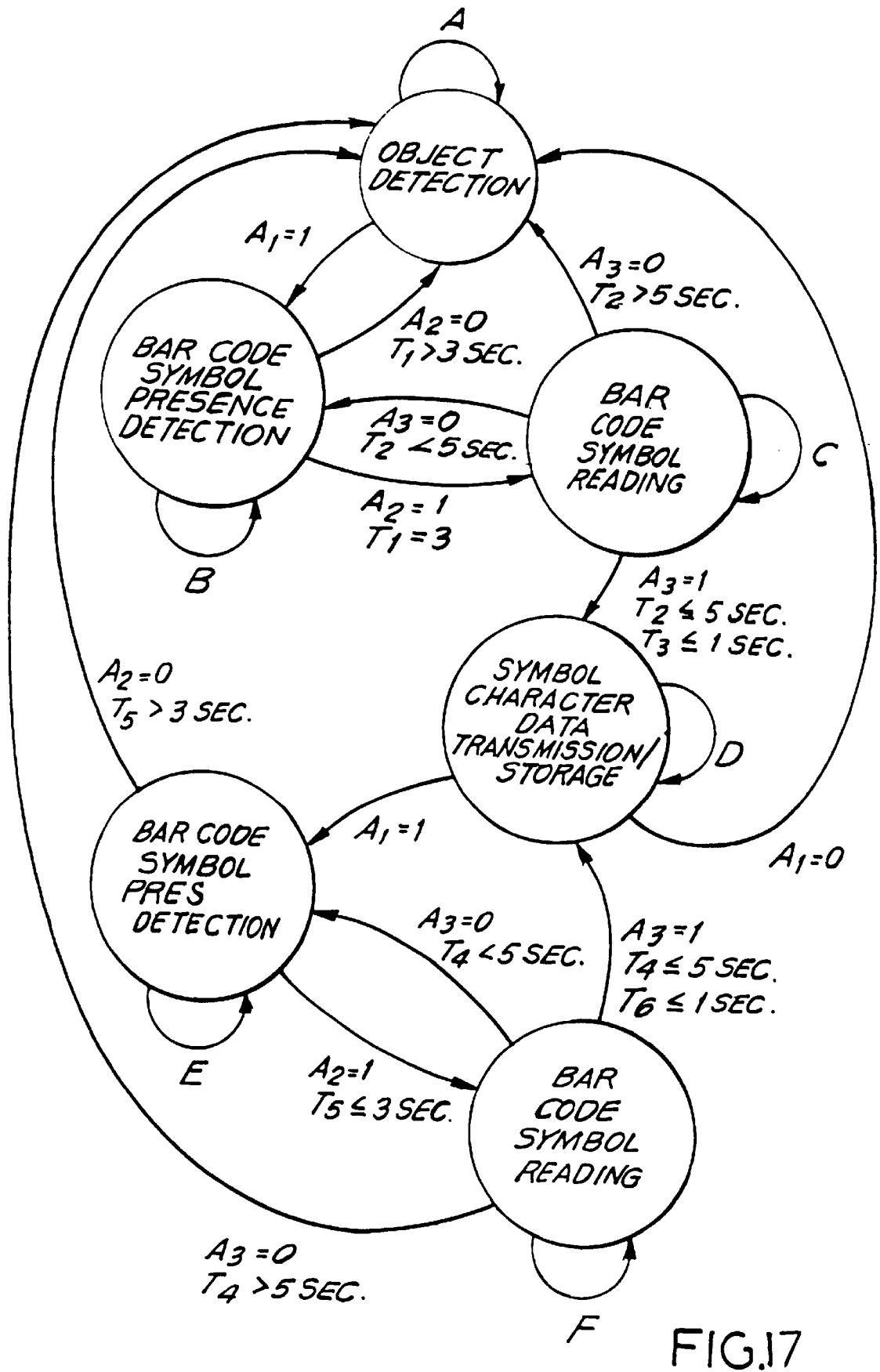
FIG. 17 is a state transition diagram showing the various state transitions that the programmable bar code symbol reading device of the present invention may undergo while in its bar code symbol reading mode.

As illustrated in FIG. 17, the automatic bar code symbol reading device of the present invention has four basic states of operation namely: object detection, bar code symbol presence detection, bar code symbol reading, and symbol character data transmission/storage. The nature of each of these states have been described hereinabove in great detail. These four states are schematically illustrated as A, B, C and D, respectively, in the state transition diagram of FIG. 17. Notably, two "extensional states" have also been provided so that the automatic bar code reading devices of the illustrative embodiments are capable of reading an infinite number of consecutively different bar code symbols without returning to the object detection state. These states of operation are indicated as E and F and represent bar code presence detection and bar code symbol reading operations, respectively. As described above, these operations are employed when attempting to automatically read one or more consecutively different bar codes symbols, that is, after a first bar code symbol has been successfully read utilizing operation states A through C.

As shown in FIG. 17, transitions between the various states are indicated by directional arrows, besides each of which are transition conditions expressed in terms of control activation signals (e.g., $A_1$, $A_2$ and $A_3$), and where appropriate, state time intervals (e.g., $T_1$, $T_2$, $T_3$, $T_4$, $T_5$ and $T_6$). Conveniently, the state diagram of FIG. 17 expresses most simply the four basic and two extensional operations occurring during the control flow within the system control programs of FIGS. 16A–16C. Significantly, the control activation signals $A_1$, $A_2$ and $A_3$ in FIG. 17 indicate which events within the object detection and/or scan fields can effect a state transition within the allotted time frame(s), where prescribed.

Having described the illustrative embodiment of the present invention, a number of modifications readily came to mind.

For example, the master and clone symbol reading devices need not be hand-supportable, nor automatic-type bar code symbol readers or scanners. Instead, the master and compatible clone symbol reading devices may be a programmable in-counter scanner; a programmable hand-held manually-trigger actuated scanner or reader; a programmable laser projection scanner; a programmable holographic scanner or reader; or the like. Anyone of these bar code symbol scanners may be fixed in position with respect to a support surface, such as a counter-top or work surface.

In an alternative embodiment, the function parameter reading computer system of the present invention need not generate a list of function-encoded bar code symbols based on those listed in conventional programming manuals. Instead, the function parameter reading computer system may be programmed to generate a shorter list of function-encoded bar code symbols, than otherwise required when using bar code symbols listed in the conventional programming manual, while achieving equivalent results. This embodiment of the present invention will have the added advantage of minimizing the amount of paper and number of codes needed to clone a multitude of bar code symbol scanners.

In another alternative embodiment, the function parameter reading computer system of the present invention may be programmed to read function parameters and create a facsimile list of function parameter encoded bar code symbols which are directly transmitted to a FAX machine located at a remote site not equipped with a conventional modem and bar code printing equipment.

In yet another alternative embodiment involving in-counter or fixed position scanners, the function parameter computer system of the present invention can be programmed to generate a BCS-Encoded Function Parameter Programming File for direct transmission to either the host computer system (e.g., cash register) or "dumb" data terminal, to which the fixed position scanner is connected. In typical retail environments, most Point of Sale (POS) terminals (e.g., cash registers) have a means, such as a cash register printer, for use in printing the list of function-encoded bar code symbols using the received BCS-Encoded Function-Parameter Programming File. Compatible bar code symbol scanners can then be programmed as "clones" of the master scanner by simply reading the list of printed bar code symbols.

While "bar and space" type code symbol scanners have been described in the illustrative embodiments, it is understood that the present invention may be practiced using other types of code symbols, such as 2-D codes that do not employ bars and spaces, such as UPC codes.

Also, while the illustrative embodiments disclosed herein will be useful in many applications in code symbol reading, further modifications to the present invention herein disclosed will occur to persons skilled in the art. All such modifications are deemed to be within the scope and spirit of the present invention defined by the appended claims to invention.

We claim:

1. A method of programming one or more functional parameters in a first code symbol reader by using programmable functionalities of a second code symbol reader, said method comprising the steps of:

(a) providing a first code symbol reader equipped with a function parameter memory for storing a plurality of programmable functionalities, wherein each said programmable functionality is implementable by setting a corresponding function parameter in said function parameter memory by reading a function-encoded code symbol preassigned to said function parameter;

(b) providing a second code symbol reader equipped with a function parameter memory for storing plurality of programmable functionalities, wherein each said programmable functionality is implementable by setting a corresponding function parameter in the function parameter memory by reading a function-encoded bar code symbol preassigned to said function parameter;

(c) programming a set of functionalities in said second code symbol reader by reading a set of function-encoded code symbols and setting a corresponding set of function parameters in the function parameter memory of said second code symbol reader;

(d) using a computer system to read said corresponding set of function parameters set in the function parameter memory of said second code symbol reader;

(e) storing said corresponding set of function parameters read in step (d);

(f) using said stored function parameters to produce a function parameter programming file;

(g) using said function parameter programming file to print a list of code symbol programming instructions, each said code symbol programming instruction including a reference to a specified function-encoded code symbol preprinted in a code symbol programming guide;

(h) following said list of said code symbol programming instructions printed during step (g) by reading each said specified function-encoded code symbol using said first bar code symbol reader, wherein one or more function parameters in said function parameter memory of said first bar code symbol reader are automatically set to the same value(s) as one or more function parameters in the function parameter memory of said second code symbol reader.

2. The method of claim 1, wherein step (f) further comprises transferring said function parameter programming file to a remote computer system, and wherein step (g) comprises said remote computer system using said transferred function parameter programming file to print said list of said code symbol programming instructions.

3. The method of claim 1, wherein step (g) comprises said computer system using said computer system using said function parameter programming file in order to print said of function-encoded code symbols.

4. A method of programming one or more functionalities of a first code symbol reader using programmed functionalities of a second code symbol reader, said method comprising the steps of:

(a) providing a first code symbol reader equipped with a function parameter memory for storing a plurality of programmable functionality parameters, wherein each of a plurality of programmable functionalities is implementable by reading a function-encoded bar code symbol preassigned to a functionality so as to cause a corresponding functionality parameter to be stored in the function parameter memory;

(b) providing a second code symbol reader equipped with a function parameter memory for storing a plurality of programmable functionality parameters, wherein each of a plurality of programmable functionalities is implementable by reading a function-encoded bar code symbol preassigned to a functionality so as to cause a corresponding functionality parameter to be stored in the function parameter memory;

(c) programming a set of functionalities in said second code symbol reader by reading a set of function-encoded bar code symbols and storing a corresponding set of functionality parameters in the function parameter memory of said second code symbol reader;

(d) using a computer system to read said corresponding set of functionality parameters stored in the function parameter memory of said second code symbol reader;

(e) storing said corresponding set of functionality parameters read in step (d) in the computer system;

(f) using said stored functionality parameters of step (e) to produce a function parameter programming file;

(g) using said function parameter programming file to generate a list of function-encoded code symbols, wherein each code symbol specifies a corresponding function parameter, and generating at least one of the function-encoded code symbols in a physically tangible form, such that the at least one function-encoded code symbol is readable by the first bar code scanner; and (h) reading one or more of the function-encoded code symbol using said first bar code symbol reader, wherein one or more function parameters in said function parameter memory of said first bar code symbol reader are automatically set to the same value(s) as one or more function parameters in the function parameter memory of said second code symbol reader.

5. The method of claim 4, wherein step (f) further comprises transferring said function parameter programming file to a remote computer system, and wherein step (g) comprises said remote computer system using said transferred function parameter programming file in order to print said one or more function-encoded code symbols, wherein each of the printed one or more function-encoded symbols is associated with a corresponding code symbol programming instruction.

6. An apparatus for programming one or more functionalities in a first code symbol reader using programmed functionalities of a second code symbol reader, wherein said first code symbol reader includes a function parameter memory for storing function parameters corresponding to a plurality of programmable functionalities, wherein each of the plurality of programmable functionalities is implementable by reading a function-encoded code symbol preassigned to said function parameter so as to cause the storing of a corresponding function parameter in said function parameter memory, and wherein said second code symbol reader includes a function parameter memory for storing function parameters corresponding to a plurality of programmable functionalities, wherein each of the plurality of programmable functionalities is implementable by reading a function-encoded code symbol preassigned to said function parameter so as to cause the storing of a corresponding function parameter in said function parameter memory, said apparatus CHARACTERIZED BY:
a menu of function-encoded code symbols readable by a bar code scanner, for use in programming a particular set of functionalities in said second code symbol reader by said second code symbol reader reading a particular set of said function-encoded bar code symbols and thereby automatically setting a corresponding set of function parameters in said function parameter memory of said first code symbol reader; and
a computer system programmed for reading said corresponding set of function parameters set in said function parameter memory of said second code symbol reader, said computer system including
a parameter storing mechanism for storing said corresponding set of read function parameters,
a file producing mechanism for producing a function parameter programming file using said stored function parameters, and
a list printing mechanism for printing a list of function-encoded code symbols using said function parameter programming file, wherein, when said list of function-encoded code symbols are read by said second code symbol reader, the function parameters in the first code symbol reader function parameter memory are automatically set to the values of the function parameters set in the function parameter memory of the second code symbol reader.

7. The apparatus of claim 6, wherein said first and second code symbol reading devices are each automatic code symbol reading devices having hand-supportable housings.

8. The apparatus of claim 6, wherein each said automatic code symbol reader includes a mechanism for producing a laser scanning beam.

9. An apparatus for programming one or more functionalities in a clone code symbol reader using the programmed functionalities of a master code symbol reader compatible with said clone code symbol reader, wherein said master code symbol reader includes a first function parameter memory, and is adapted to provide any of a plurality of programmable functionalities, wherein each said programmable functionality is implementable by setting a corresponding function parameter in said function parameter memory by reading a function-encoded code symbol preassigned to said function parameter, and wherein said clone bar code symbol reader includes a function parameter memory, and is adapted to provide any of a plurality of programmable functionalities, wherein each said programmable functionality is implementable by setting a corresponding function parameter in said second function parameter memory by reading a function-encoded code symbol preassigned to said function parameter;

said apparatus comprising:
a printed menu of function-encoded code symbols, for use in programming a particular set of functionalities in said master code symbol reader by said master code symbol reader reading a particular set of said function-encoded bar code symbols and thereby automatically setting a corresponding set of function parameters in the function parameter memory of said master code symbol reader; and
a computer system programmed for reading said corresponding set of function parameters set in the function parameter memory of said master code symbol reader, said computer system including
a parameter storing mechanism for storing said corresponding set of read function parameters,
a file producing mechanism for producing a function parameter programming file using said stored function parameters, and
a list printing mechanism for printing a list of code symbol programming instructions using said function parameter programming instructions, each said code symbol programming instruction including a reference to a specified function-encoded code symbol preprinted in said menu of function-encoded code symbols;
wherein, when the function-encoded code symbols referenced in said list of code symbol programming instructions are read by said clone code symbol programming instructions are read by said clone code symbol reader, the function parameters in said second function parameter memory are automatically set to the values of the function parameters set in the first function parameter memory of said master code symbol reader.

10. The apparatus of claim 9, wherein said master and clone code symbol reading devices are each automatic code symbol reading devices having hand-supportable housings.

11. The apparatus of claim 9, wherein each said automatic code symbol reader includes a means for producing a laser scanning beam.

* * * * *